(12) United States Patent
Noda

(10) Patent No.: US 9,739,978 B2
(45) Date of Patent: *Aug. 22, 2017

(54) IMAGING LENS AND IMAGING APPARATUS EQUIPPED WITH THE IMAGING LENS

(71) Applicant: FUJIFILM Corporation, Tokyo (JP)

(72) Inventor: Takayuki Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 232 days.

This patent is subject to a terminal disclaimer.

(21) Appl. No.: 14/667,747

(22) Filed: Mar. 25, 2015

(65) Prior Publication Data

US 2015/0277085 A1    Oct. 1, 2015

(30) Foreign Application Priority Data

Mar. 31, 2014   (JP) .................. 2014/071201

(51) Int. Cl.
*G02B 13/18* (2006.01)
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ............... G02B 13/0045; G02B 9/62
USPC ......................................... 359/713
See application file for complete search history.

(56) References Cited

U.S. PATENT DOCUMENTS

| 8,854,745 | B1 | 10/2014 | Chen | |
|---|---|---|---|---|
| 2015/0253547 | A1* | 9/2015 | Sun | G02B 13/0045 359/713 |
| 2015/0338615 | A1* | 11/2015 | Sun | G02B 13/0045 359/713 |
| 2016/0011405 | A1* | 1/2016 | Shinohara | G02B 9/62 359/713 |

FOREIGN PATENT DOCUMENTS

| JP | 2013-242449 | 12/2013 |
|---|---|---|
| TW | 201333575 | 8/2013 |

* cited by examiner

*Primary Examiner* — Scott J Sugarman
(74) *Attorney, Agent, or Firm* — Young & Thompson

(57) ABSTRACT

An imaging lens is constituted essentially by six lenses, including: a first lens of a biconvex shape; a second lens having a negative refractive power and is of a meniscus shape with a concave surface toward the image side; a third lens of a meniscus shape with a convex surface toward the object side; a fourth lens of a meniscus shape with a concave surface toward the object side; a fifth lens having a positive refractive power; and a sixth lens having a negative refractive power and a concave surface toward the image side, provided in this order from the object side.

20 Claims, 23 Drawing Sheets

EXAMPLE 1

EXAMPLE 6

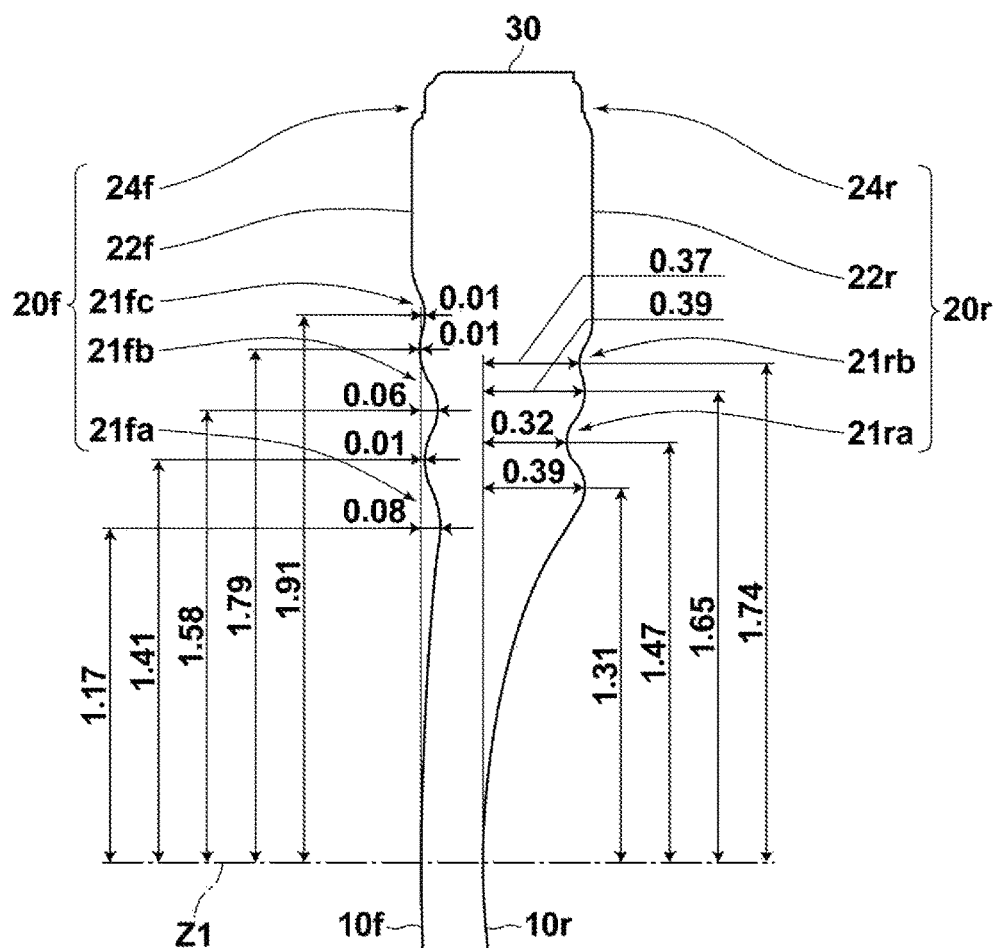
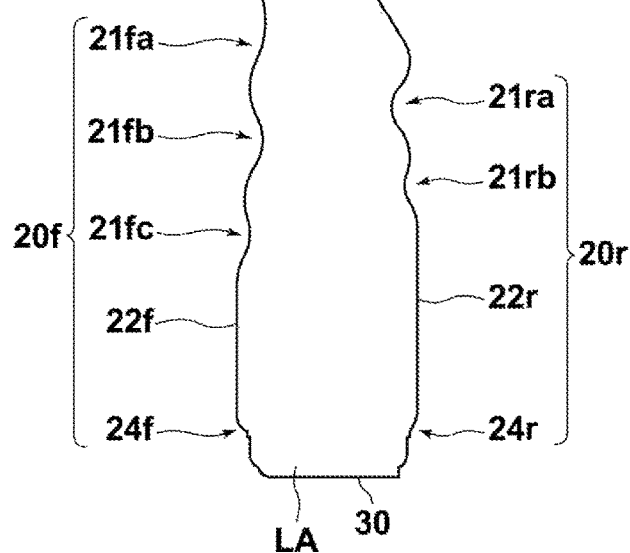
FIG.18

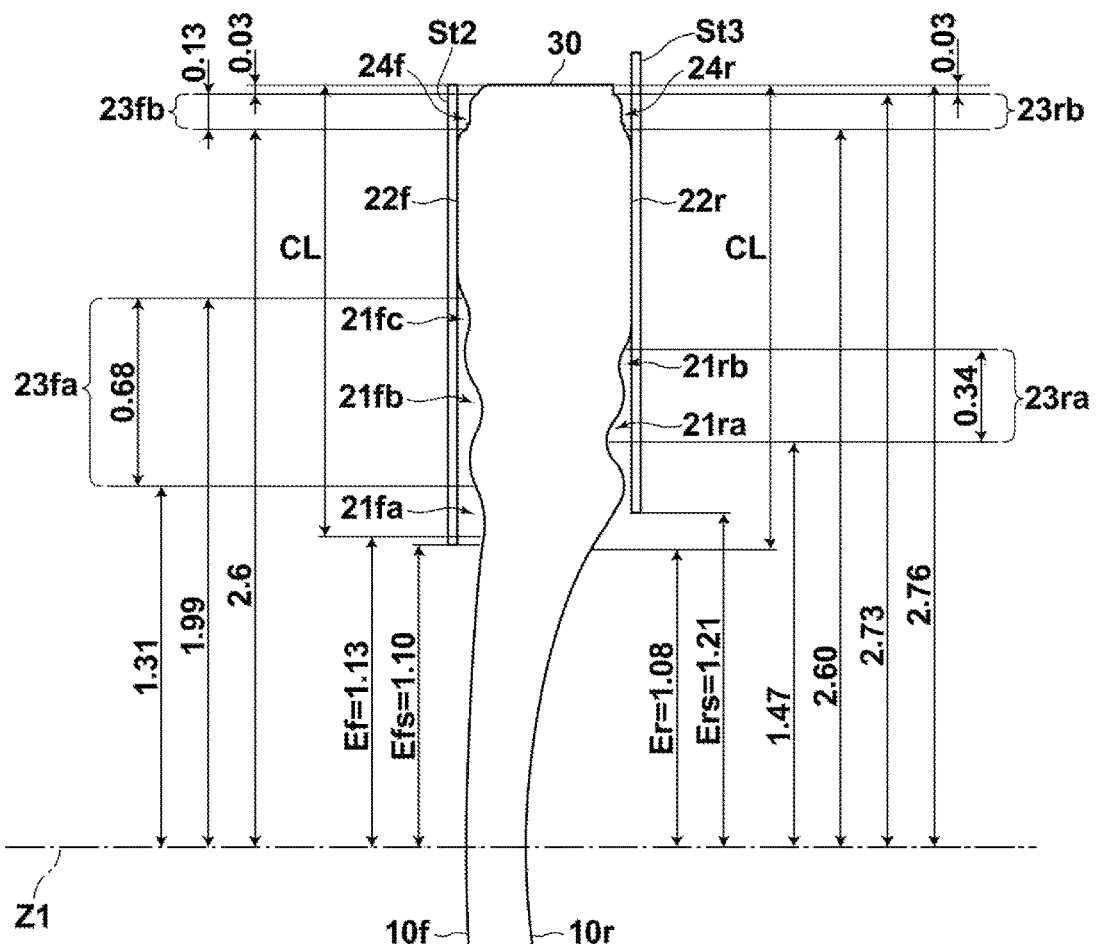
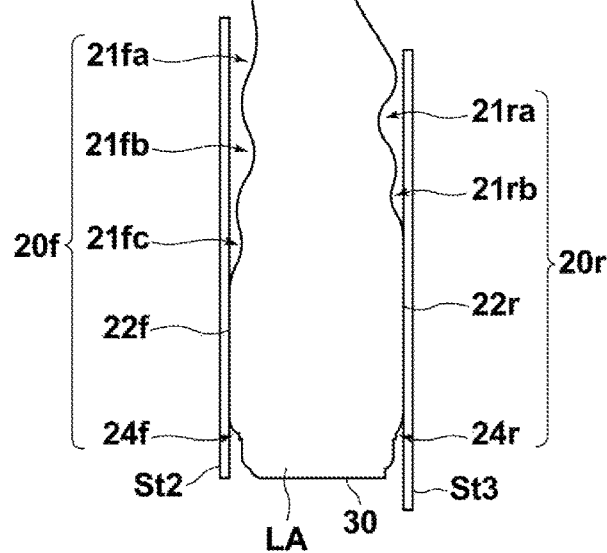
FIG.19

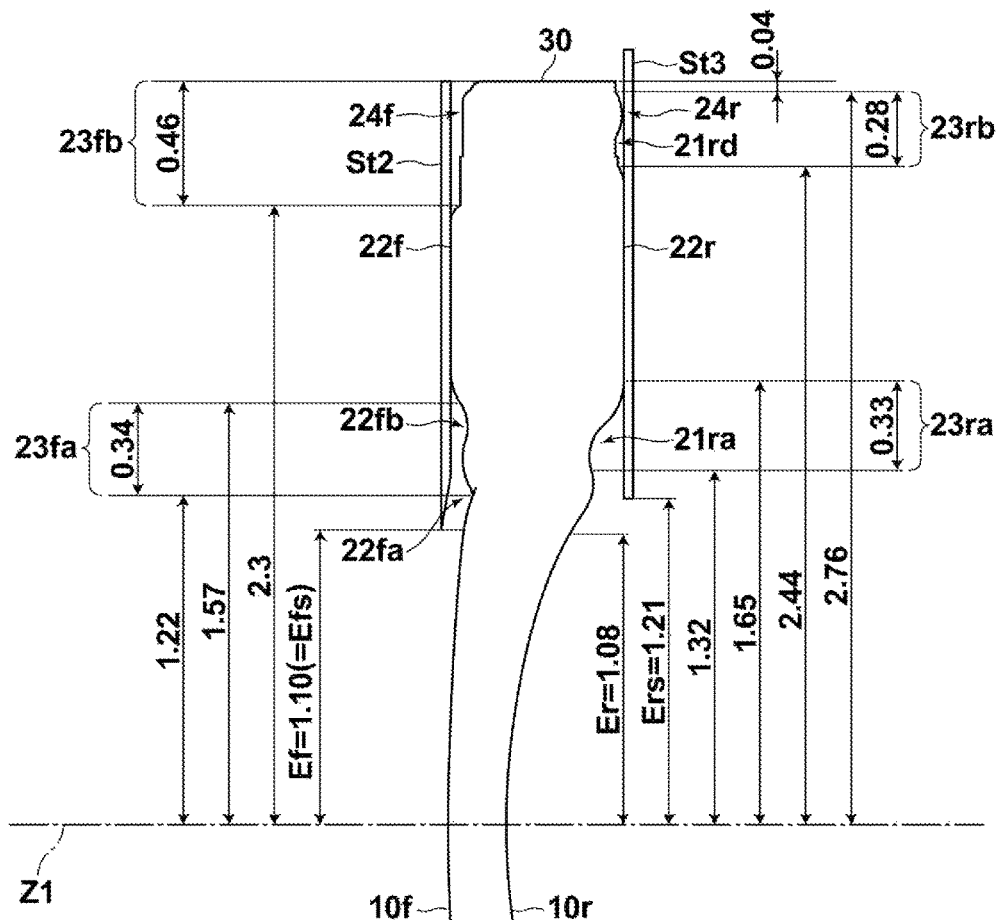
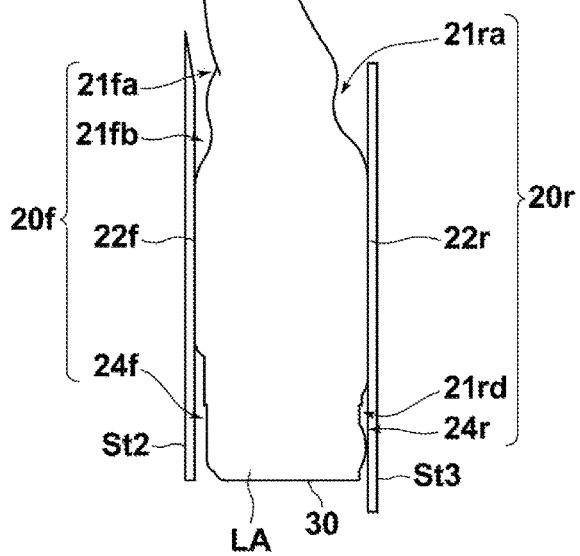
FIG.25

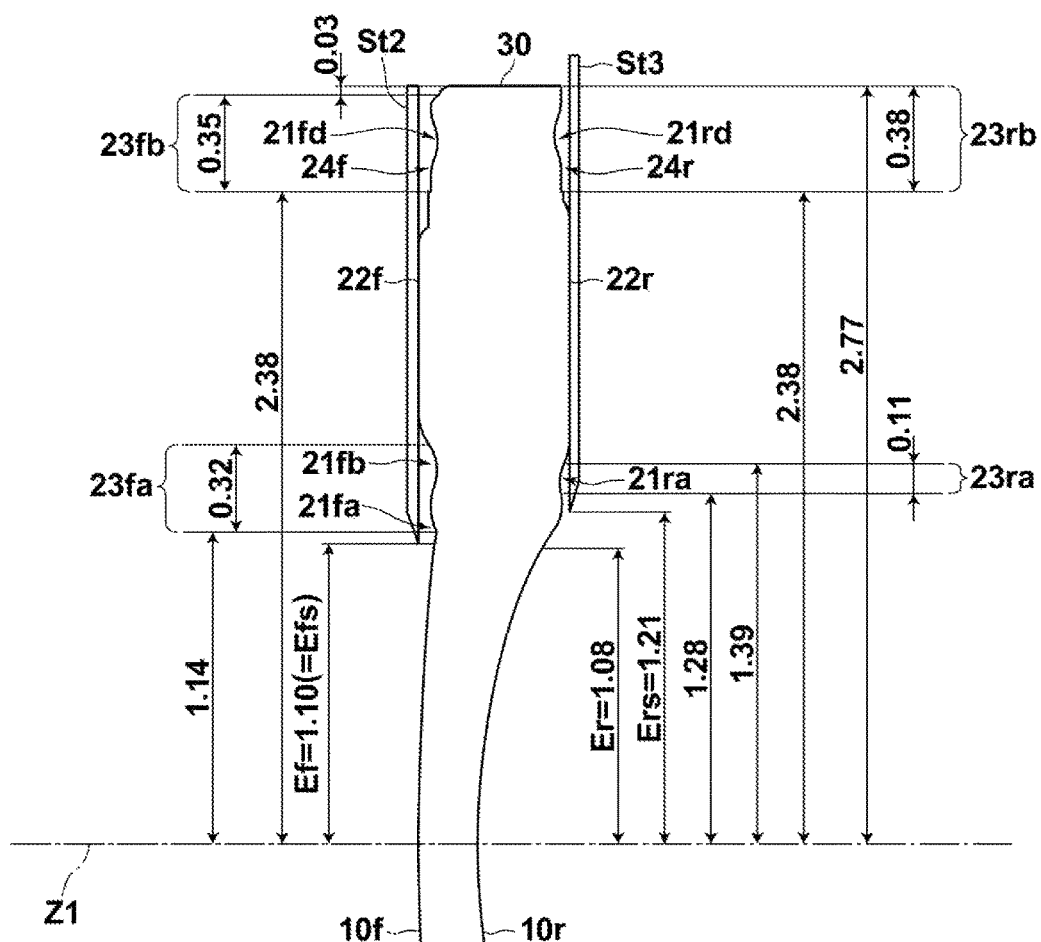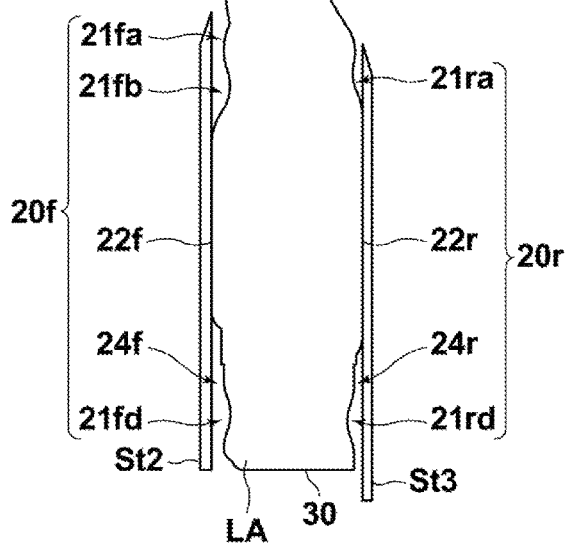
FIG.26

IMAGING LENS AND IMAGING APPARATUS EQUIPPED WITH THE IMAGING LENS

CROSS REFERENCE TO RELATED APPLICATIONS

The present application claims priority under 35 USC §119 to Japanese Patent Application No. 2014-071201 filed on Mar. 31, 2014. The above application is hereby expressly incorporated by reference in its entirety, into the present application.

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

BACKGROUND ART

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed, and imaging lenses having a six lens configuration, which is an even greater number of lenses, have been proposed for further improvements in performance. For example, Japanese Unexamined Patent Publication No. 2013-242449 and Taiwanese Patent Publication No. 201333575 propose imaging lenses having six lens configurations.

BACKGROUND ART DOCUMENTS

Patent Documents

[Patent Document 1]
Japanese Unexamined Patent Publication No. 2013-242449
[Patent Document 2]
Taiwanese Patent Publication No. 201333575

DISCLOSURE OF THE INVENTION

Meanwhile, there is demand for imaging lenses having comparatively short total lengths for use in apparatuses such as portable terminals, smart phones, and tablet type terminals in particular to realize wider angles of view. In addition, there is demand for an appropriate amount of back focus to be secured in imaging lenses, while satisfying the demand for a shortened total length of the lens.

However, the angles of view of the imaging lenses disclosed in Japanese Unexamined Patent Publication No. 2013-242449 and Taiwanese Patent Publication No. 201333575 are too narrow with respect to a desired angle of view. In addition, the back focus of the imaging lens disclosed in Taiwanese Patent Publication No. 201333575 is too short.

The present invention has been developed in view of the foregoing points. The object of the present invention is to provide an imaging lens that can achieve a wide angle of view, secure a necessary amount of back focus, and a shortening of the total length while being compatible with imaging elements that satisfy demand for an increased number of pixels, and realizes high imaging performance from a central angle of view to peripheral angles of view. It is another object of the present invention to provide an imaging apparatus equipped with the imaging lens, which is capable of obtaining high resolution photographed images.

A first imaging lens of the present invention consists essentially of six lenses, including:
a first lens of a biconvex shape;
a second lens having a negative refractive power and is of a meniscus shape with a concave surface toward the image side;
a third lens of a meniscus shape with a convex surface toward the object side;
a fourth lens of a meniscus shape with a concave surface toward the object side;
a fifth lens having a positive refractive power; and
a sixth lens having a negative refractive power and a concave surface toward the image side, provided in this order from the object side.

A second imaging lens of the present invention consists essentially of six lenses, including:
a first lens having a positive refractive power and a convex surface toward the object side;
a second lens having a negative refractive power and is of a meniscus shape with a concave surface toward the image side;
a third lens of a meniscus shape with a convex surface toward the object side;
a fourth lens;
a fifth lens having a positive refractive power; and
a sixth lens having a negative refractive power and a concave surface toward the image side, provided in this order from the object side;
the imaging lens satisfying the conditional formulae below:

$$f/f56 < 0 \quad (1)$$

$$0.7 < DDL/f < 0.98 \quad (2)$$

wherein f56 is the combined focal length of the fifth lens and the sixth lens, f is the focal length of the entire system, and DDL is the distance from the surface of the first lens toward the object side and the surface of the sixth lens toward the image side along the optical axis.

A third imaging lens of the present invention consists essentially of six lenses, including:
a first lens having a positive refractive power and a convex surface toward the object side;

a second lens having a negative refractive power and a concave surface toward the image side;

a third lens of a meniscus shape with a convex surface toward the object side;

a fourth lens having a positive refractive power;

a fifth lens having a positive refractive power; and a sixth lens having a negative refractive power and a concave surface toward the image side, provided in this order from the object side;

the imaging lens satisfying the conditional formulae below:

$$f/f56<0 \quad (1)$$

$$0.7<DDL/f<0.98 \quad (2)$$

wherein f56 is the combined focal length of the fifth lens and the sixth lens, f is the focal length of the entire system, and DDL is the distance from the surface of the first lens toward the object side and the surface of the sixth lens toward the image side along the optical axis.

Note that in the first through third imaging lenses of the present invention, the expression "consists essentially of six lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the six lenses. In addition, the shapes of the surfaces of the lenses and the signs of the refractive indices thereof are considered in the paraxial region in the case that the lenses include aspherical surfaces.

The optical performance of the first through third imaging lenses of the present invention can be further improved by adopting the following favorable configurations.

In the first through third imaging lenses of the present invention, it is preferable for the surface of the third lens toward the image side to be of an aspherical shape having at least one inflection point at a position in an inwardly radial direction from the intersection of a principal light ray at a maximum angle of view and the surface of the third lens toward the image side to the optical axis.

It is preferable for the first through third imaging lenses of the present invention to further be equipped with an aperture stop positioned at the object side of the surface of the first lens toward the object side.

The first through third imaging lenses of the present invention may satisfy one or arbitrary combinations of Conditional Formulae (3) through (9) and (1-1) through (7-1) below.

$$-4<f/f56<-0.1 \quad (1\text{-}1)$$

$$0.8<DDL/f<0.96 \quad (2\text{-}1)$$

$$0<f \cdot P56<2 \quad (3)$$

$$0.1<f \cdot P56<1.27 \quad (3\text{-}1)$$

$$0<f \cdot P45<1.7 \quad (4)$$

$$0.32<f \cdot P45<1.65 \quad (4\text{-}1)$$

$$0<f/f5<1 \quad (5)$$

$$0.01<f/f5<0.98 \quad (5\text{-}1)$$

$$20<v2<28 \quad (6)$$

$$21<v2<25 \quad (6\text{-}1)$$

$$20<v5<28 \quad (7)$$

$$21<v5<25 \quad (7\text{-}1)$$

$$1<f/f1<2 \quad (8)$$

$$0.5<f \tan \omega/L6r<20 \quad (9)$$

wherein f is the focal distance of the entire system, f1 is the focal length of the first lens, f5 is the focal length of the fifth lens, f56 is the combined focal length of the fifth lens and the sixth lens, DDL is the distance from the surface of the first lens toward the object side to the surface of the sixth lens toward the image side along the optical axis, v2 is the Abbe's number of the second lens with respect to the d line, v5 is the Abbe's number of the fifth lens with respect to the d line, ω is half the maximum angle of view when focused on an object at infinity, L6r is the paraxial radius of curvature of the surface of the sixth lens toward the image side, P56 is the refractive power of an air lens formed between the surface of the fifth lens toward the image side and the surface of the sixth lens toward the object side, the refractive power of the air lens being obtained by Formula (P1) below, and P45 is the refractive power of an air lens formed between the surface of the fourth lens toward the image side and the surface of the fifth lens toward the object side, the refractive power of the air lens being obtained by Formula (P2) below:

$$P56 = \frac{1-Nd5}{L5r} + \frac{Nd6-1}{L6f} - \frac{(1-Nd5)\times(Nd6-1)\times D11}{L5r \times L6f} \quad (P1)$$

wherein Nd5 is the refractive index of the fifth lens with respect to the d line, Nd6 is the refractive index of the sixth lens with respect to the d line, L5r is the paraxial radius of curvature of the surface of the fifth lens toward the image side, L6f is the paraxial radius of curvature of the surface of the sixth lens toward the object side, and D11 is an air space distance between the fifth lens and the sixth lens along the optical axis;

$$P45 = \frac{1-Nd4}{L4r} + \frac{Nd5-1}{L5f} - \frac{(1-Nd4)\times(Nd5-1)\times D9}{L4r \times L5f} \quad (P2)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

An imaging apparatus of the present invention is equipped with one of the first through third imaging lenses of the present invention.

According to the first through third imaging lenses of the present invention, the configuration of each lens element is optimized within a lens configuration having six lenses as a whole. Therefore, lens systems that can achieve a wide angle of view, secure a sufficient amount of back focus, realize a short total length while being compatible with imaging elements that satisfy demand for an increased number of pixels and has high imaging performance from a central angle of view to peripheral angles of view can be realized.

The imaging apparatus of the present invention is equipped with one of the first through third imaging lenses of the present invention having high imaging performance. Therefore, the imaging apparatus of the present invention is capable of obtaining high resolution photographed images.

BRIEF DESCRIPTION OF THE DRAWINGS

FIG. 18 is a sectional diagram that illustrates a first modification of a flange surface of the imaging lens of FIG. 1.

FIG. 19 is a diagram that illustrates the relative arrangement between the lens of FIG. 18 and stops.

FIG. 25 is a sectional diagram that illustrates a second modification of a flange surface of the imaging lens of FIG. 1.

FIG. 26 is a sectional diagram that illustrates a third modification of a flange surface of the imaging lens of FIG. 1.

BEST MODE FOR CARRYING OUT THE INVENTION

Hereinafter, embodiments of the present invention will be described in detail with reference to the attached drawings.

Figure 1:
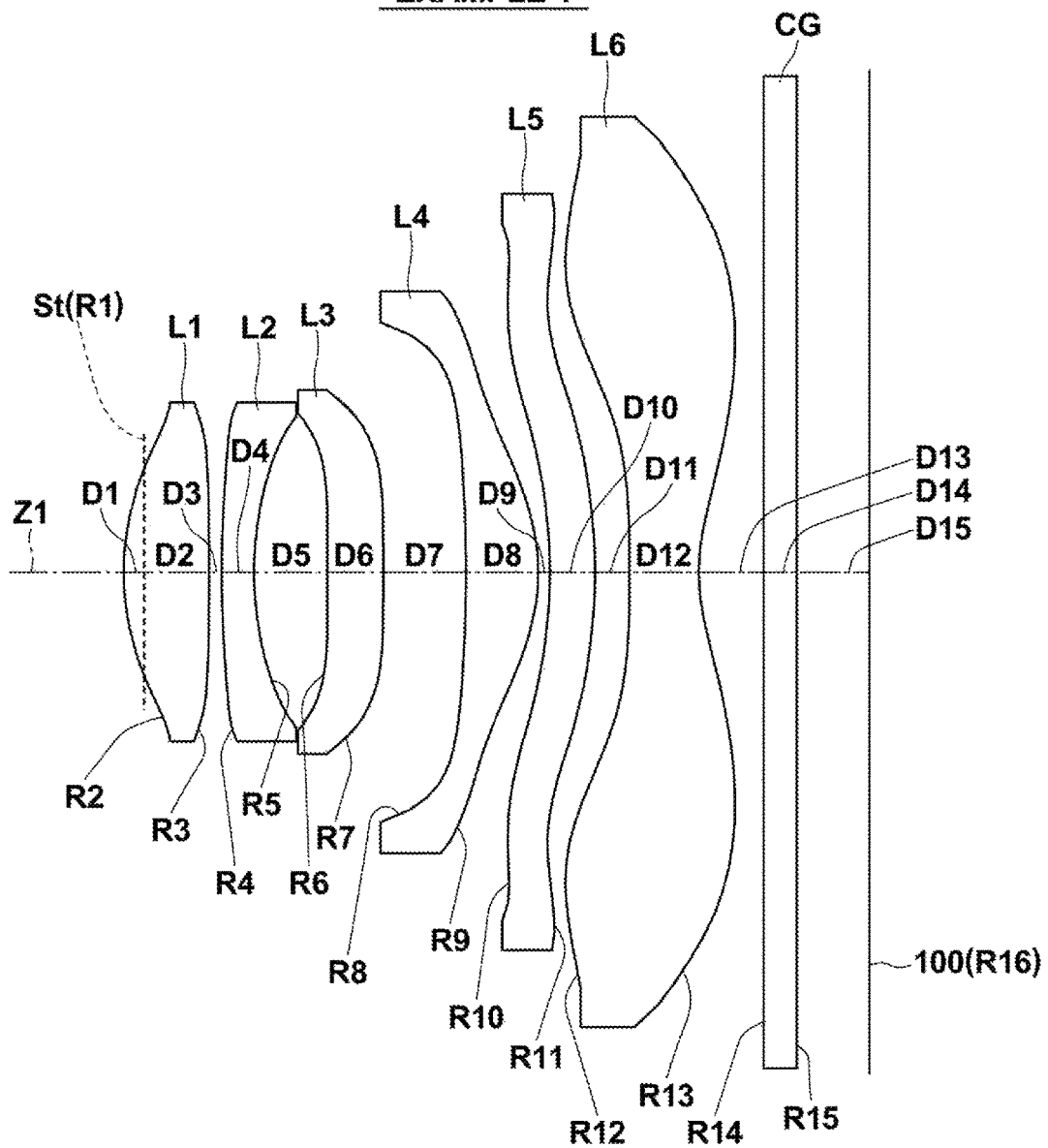
FIG. 1 is a sectional diagram that illustrates a first example of the configuration of an imaging lens according to an embodiment of the present invention, and corresponds to a lens of Example 1.
Figure 2:
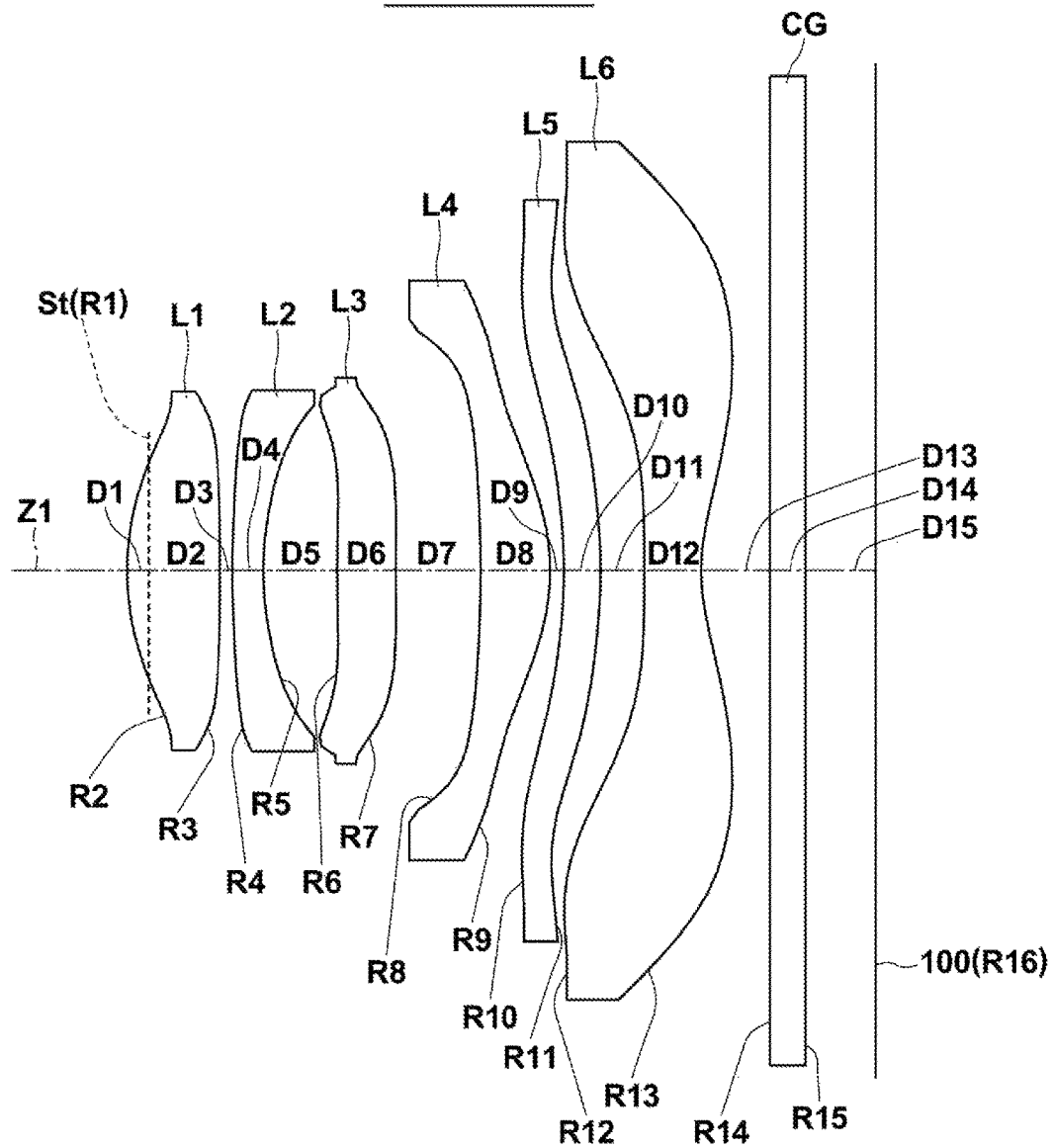
FIG. 2 is a sectional diagram that illustrates a second example of the configuration of an imaging lens according to an embodiment of the present invention, and corresponds to a lens of Example 2.
Figure 3:
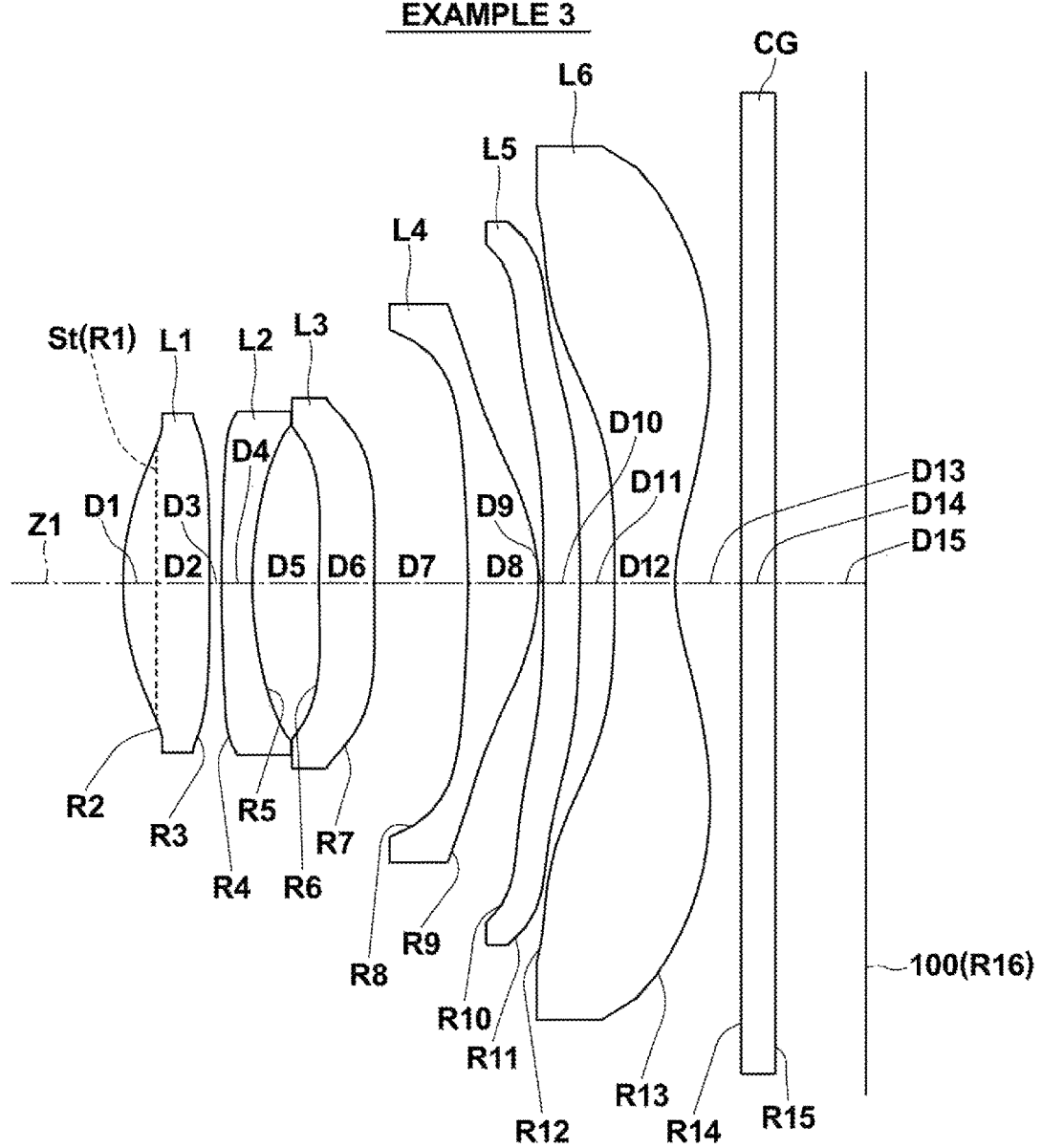
FIG. 3 is a sectional diagram that illustrates a third example of the configuration of an imaging lens according to an embodiment of the present invention, and corresponds to a lens of Example 3.
Figure 4:
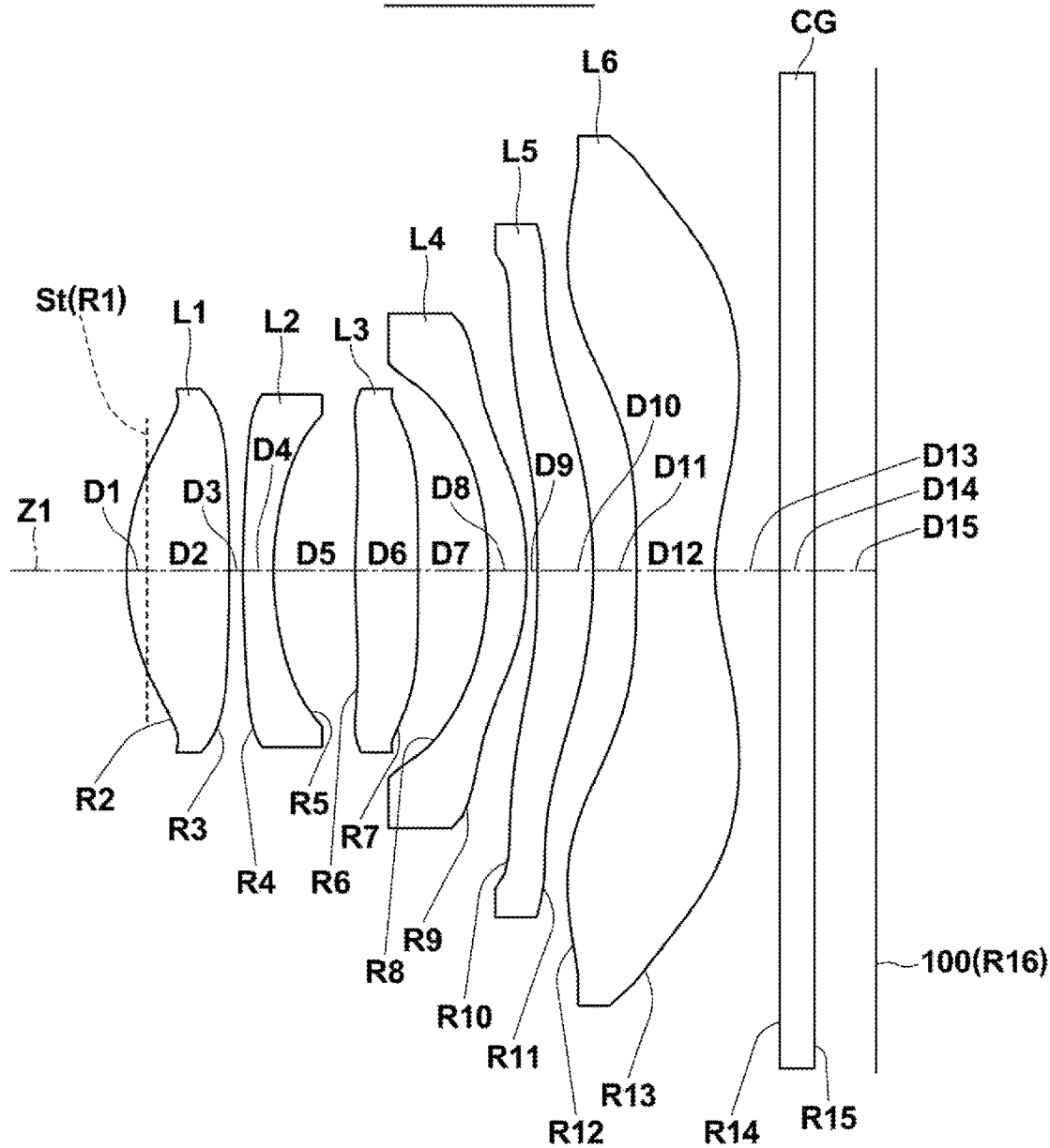
FIG. 4 is a sectional diagram that illustrates a fourth example of the configuration of an imaging lens according to an embodiment of the present invention, and corresponds to a lens of Example 4.
Figure 5:
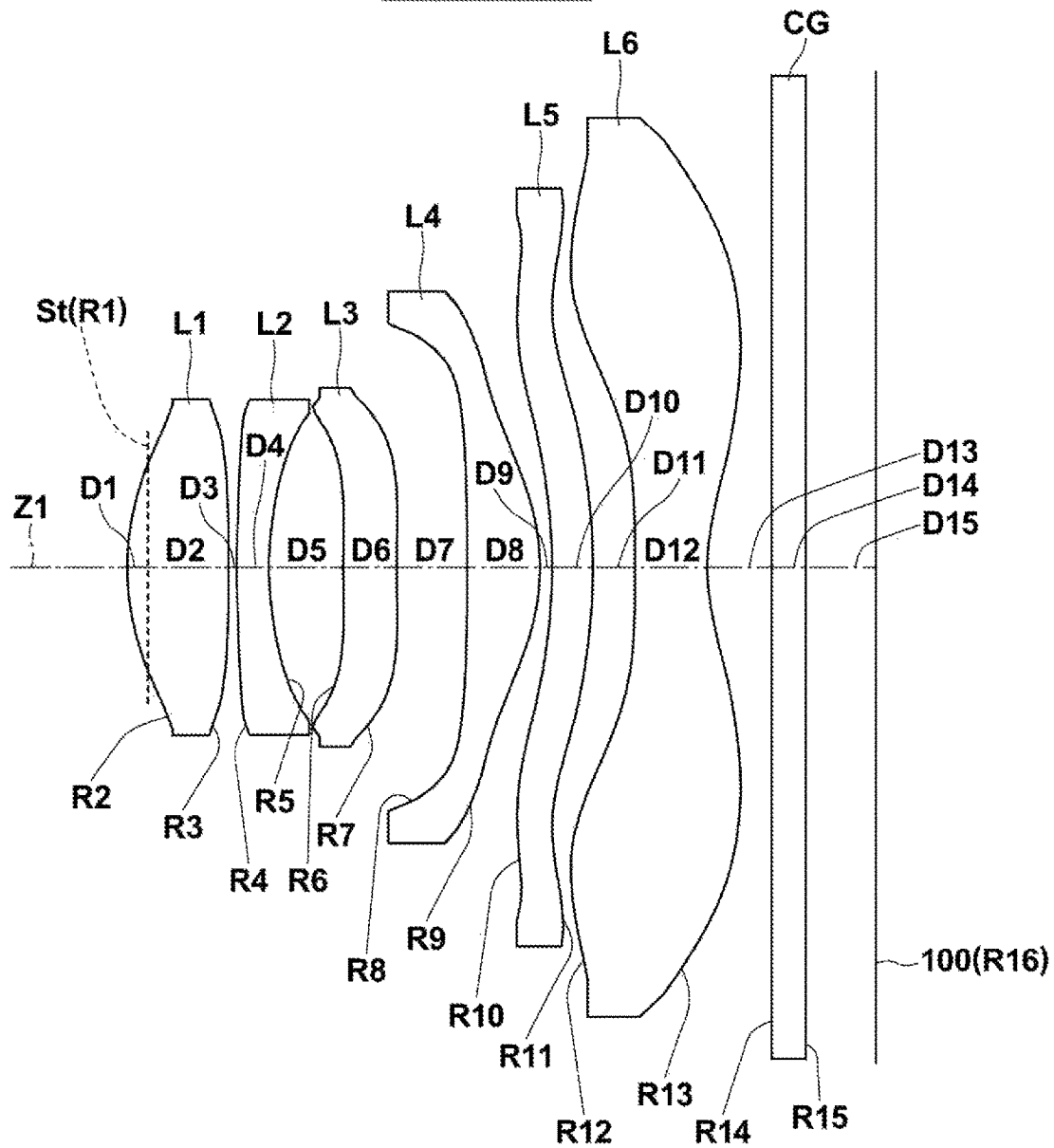
FIG. 5 is a sectional diagram that illustrates a fifth example of the configuration of an imaging lens according to an embodiment of the present invention, and corresponds to a lens of Example 5.
Figure 6:
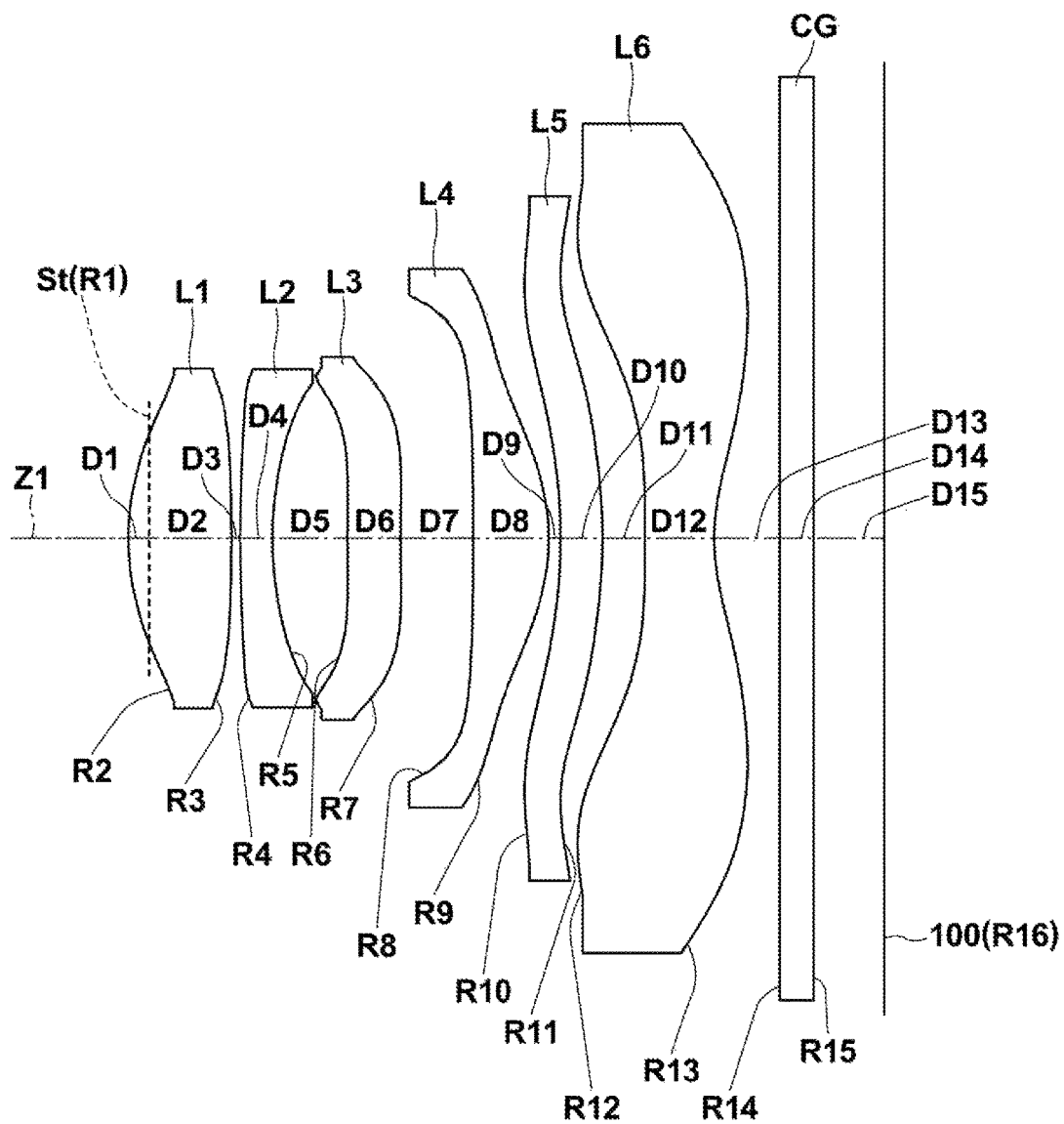
FIG. 6 is a sectional diagram that illustrates a sixth example of the configuration of an imaging lens according to an embodiment of the present invention, and corresponds to a lens of Example 6.
Figure 7:
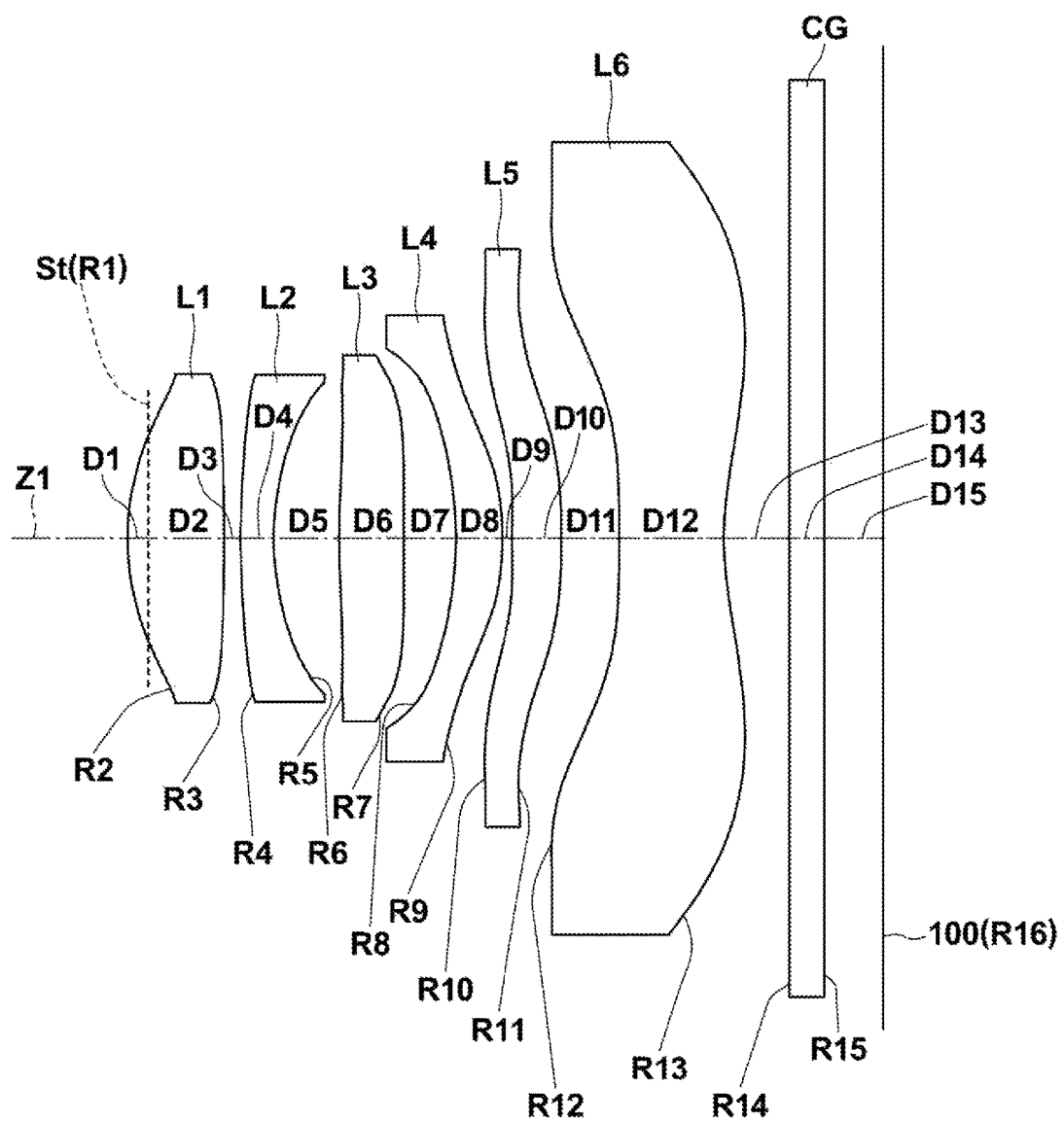
FIG. 7 is a sectional diagram that illustrates a seventh example of the configuration of an imaging lens according to an embodiment of the present invention, and corresponds to a lens of Example 7.
Figure 8:
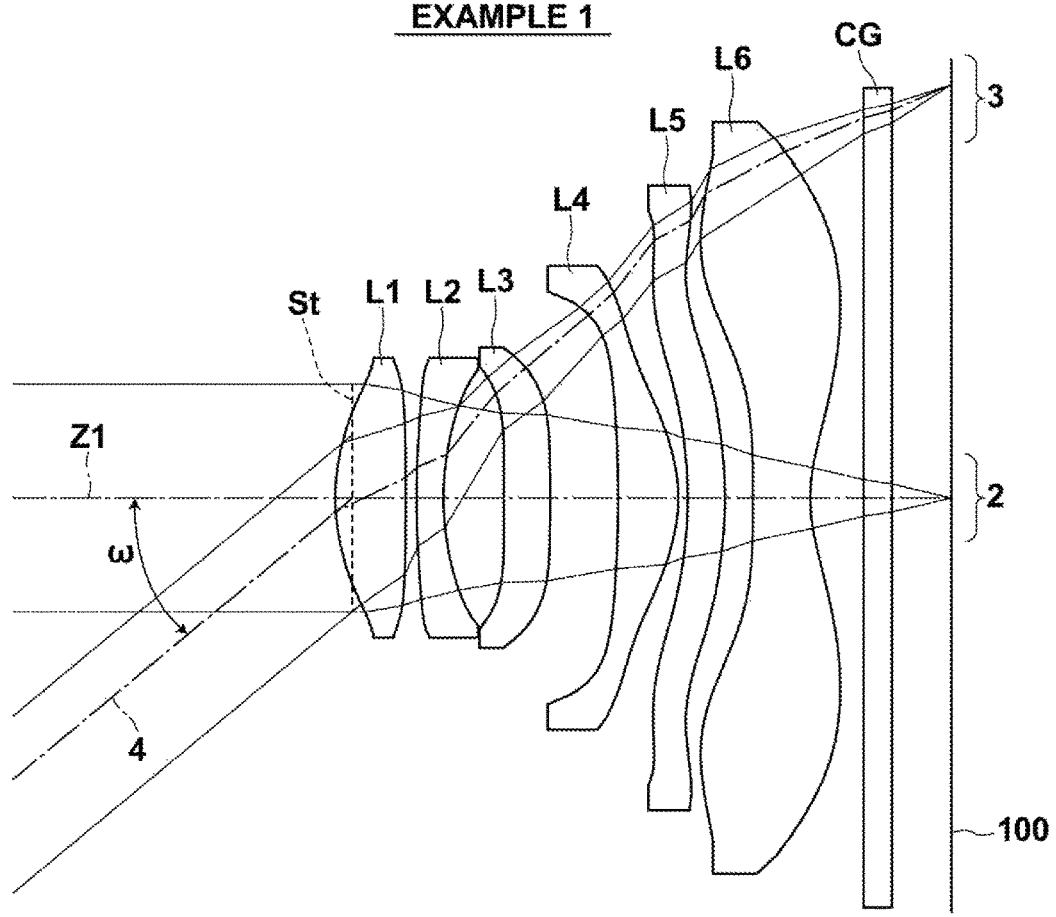
FIG. 8 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 7 are sectional diagrams that illustrate second through seventh examples of lens configurations that correspond to Numerical Examples 2 through 7 (Table 3 through Table 14). In FIG. 1 through FIG. 7, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 7 will also be described as necessary. In addition, FIG. 8 is a diagram that illustrates the paths of light rays that pass through the imaging lens L of FIG. 1. FIG. 8 illustrates the paths of axial light beams 2 and maximum angle of view light beams 3 from an object at a distance of infinity, and a half value to of a maximum angle of view. Note that a principal light ray 4 of the maximum angle of view light beams 3 is indicated by a single dot chained line.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, a fifth lens L5, and a sixth lens L6, provided along the optical axis Z1 in this order from the object side.

Figure 16:
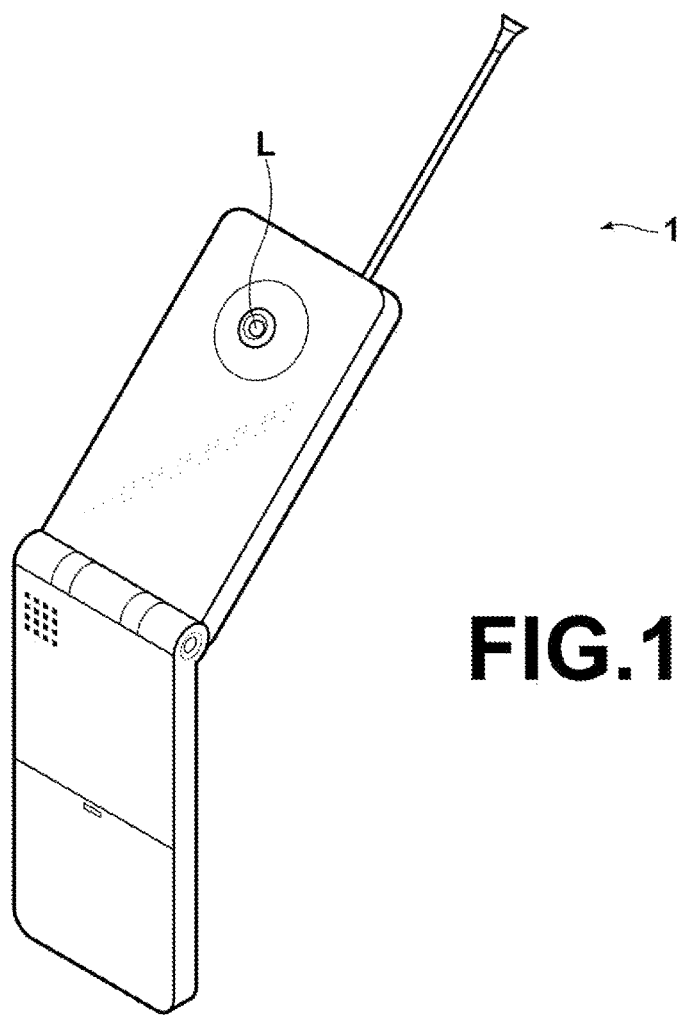
FIG. 16 is a diagram that illustrates a cellular telephone as an imaging apparatus equipped with the imaging lens of the present invention.

FIG. 16 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface R16 in FIG. 1 through FIG. 7) of the imaging lens L.

Figure 17:
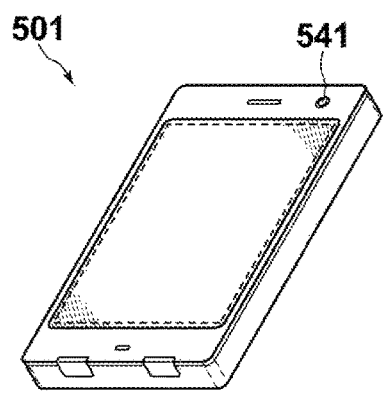
FIG. 17 is a diagram that illustrates a smart phone as an imaging apparatus equipped with the imaging lens of the present invention.

FIG. 17 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface) of the imaging lens L.

Various optical members CG may be provided between the sixth lens L6 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the sixth lens L6 to obtain the same effect as that of the optical member CG. In this case, the number of parts can be reduced, and the total length can be shortened.

It is preferable for the imaging lens L to be equipped with an aperture stop St positioned at the object side of the surface of the first lens L1 toward the object side. In the case that the aperture stop St is provided in this manner, high imaging performance capable of being compatible with imaging elements that satisfy demand for an increased number of pixels, a small F number, and a shortening of the total length of the lens can be realized. In addition, telecentric properties can be secured. That is, it will become possible to cause principal rays of light to become as parallel to the optical axis as possible, and increases in the incident angles of light rays that pass through the optical system and enter the image formation plane (imaging element) can be suppressed, particularly at peripheral portions of an imaging region. Note that the expression "positioned at the object side of the surface of the first lens L1 toward the object side" means that the position of the aperture stop in the direction of the optical axis is at the same position as the intersection of marginal axial rays of light and the surface of the first lens L1 toward the object side, or more toward the object side than this position. In the embodiments, the lenses of the first through seventh Examples (FIGS. 1 through 7) are examples in which the aperture stop St is positioned at the object side of the first lens L1. In addition, the aperture stops St illustrated in the figures do not necessarily represent the sizes or shapes thereof, but indicate the positions thereof on the optical axis Z1.

In the imaging lens L, the first lens L1 has a positive refractive power in the vicinity of the optical axis. This configuration is advantageous from the viewpoint of shortening the total length of the lens. In addition, the first lens L1 has a convex surface toward the object side in the vicinity of the optical axis. Therefore, sufficiently increasing the positive refractive power of the first lens L1, which bears the principal imaging function of the imaging lens L, is facilitated, and a shortening of the total length of the lens can be more favorably realized. In addition, the first lens L1 may be of a biconvex shape in the vicinity of the optical axis. In this case, the positive refractive power of the first lens L1 can be favorably secured by distributing refractive power between the surface of the first lens L1 toward the object side and the surface of the first lens L1 toward the image side, while suppressing the generation of spherical aberration can be suppressed.

The second lens L2 has a negative refractive power in the vicinity of the optical axis. Thereby, chromatic aberration and spherical aberration can be favorably corrected. In addition, the second lens L2 has a concave surface toward the image side in the vicinity of the optical axis. Therefore, moving the rearward principal point of the second lens L2 toward the object side is facilitated, and the total length of the lens can be favorably shortened. Further, it is preferable for the second lens L2 to be of a meniscus shape having a concave surface toward the image side in the vicinity of the optical axis. In this case, the total length of the lens can be more favorably shortened.

The third lens L3 is of a meniscus shape having a convex surface toward the object side in the vicinity of the optical axis. For this reason, the rearward principal point of the third lens L3 can be more favorably moved toward the object side, and a shortening of the total length of the lens can be favorably realized. In addition, it is preferable for the surface of the third lens L3 toward the image side to be of an aspherical shape having at least one inflection point at a position in an inwardly radial direction from the intersection of a principal light ray at a maximum angle of view and the surface of the third lens L3 toward the image side to the optical axis. In this case, the surface of the third lens L3 toward the image side will be concave in the vicinity of the optical axis, and convex at portions in a radially outward direction from the inflection point. Therefore, astigmatism can be favorably corrected. Note that the "inflection point" on the surface of the third lens L3 toward the image side refers to a point at which the shape of the surface of the third lens L3 toward the image side changes from a convex shape to a concave shape (or from a concave shape to a convex shape) with respect to the image side. In addition, in the present specification, the expression "a position in an inwardly radial direction from the intersection of a principal light ray at a maximum angle of view and the surface toward the image side to the optical axis" refers to positions at the intersection of a principal light ray at a maximum angle of view and the surface toward the image side to the optical axis and positions radially inward toward the optical axis from these positions. In addition, the inflection point on the surface of the third lens L3 toward the image side may be provided at any position at the intersection of a principal light ray at a maximum angle of view and the surface of the third lens L3 toward the image side to the optical axis and at any position radially inward toward the optical axis from these positions.

Note that the third lens L3 may have a positive refractive power in the vicinity of the optical axis or may have a negative refractive power in the vicinity of the optical axis, as long as it is capable of realized desired performance. In the case that the third lens L3 has a positive refractive power in the vicinity of the optical axis, spherical aberration can be favorably corrected. In the case that the third lens L3 has a negative refractive power in the vicinity of the optical axis, such a configuration is advantageous from the viewpoint of correcting longitudinal chromatic aberration and lateral chromatic aberration.

In addition, the imaging lens L is equipped with the fourth lens L4. For this reason, a sufficient number of lens surfaces can be secured, and the degree of freedom in design can be improved. This configuration is advantageous from the viewpoint of favorably correcting various aberrations at the peripheral portions of the imaging region. The fourth lens L4 may have a positive refractive power in the vicinity of the optical axis or may have a negative refractive power in the vicinity of the optical axis, as long as it is capable of realized desired performance. In the case that the fourth lens L4 has a positive refractive power in the vicinity of the optical axis, the generation of spherical aberration can be favorably suppressed. In the case that the fourth lens L4 has a negative refractive power in the vicinity of the optical axis, such a configuration is advantageous from the viewpoint of correcting longitudinal chromatic aberration and lateral chromatic aberration. In addition, it is preferable for the fourth lens L4 to have a concave surface toward the object side in the vicinity of the optical axis. In this case, the generation of astigmatism can be favorably suppressed. In addition, it is preferable for the fourth lens L4 to be of a meniscus shape having a concave surface toward the object side in the vicinity of the optical axis. In this case, the generation of astigmatism can be further favorably suppressed.

The fifth lens L5 has a positive refractive power in the vicinity of the optical axis. For this reason, the generation of spherical aberration can be favorably suppressed. In addition, the fifth lens L5 may be of a biconcave shape in the vicinity of the optical axis. In this case, the generation of spherical aberration can be favorably suppressed, while securing the refractive power of the fifth lens L5. Alternatively, the fifth lens L5 may be of a meniscus shape having a concave surface toward the object side in the vicinity of the optical axis. In this case, the generation of astigmatism can be suppressed.

The sixth lens L6 has a negative refractive power in the vicinity of the optical axis. Moving the position of the rearward principal point of the imaging lens L is facilitated by the sixth lens L6, which is the lens provided most toward the image side in the imaging lens L, having a negative refractive power. As a result, a shortening of the total length of the lens can be favorably realized. Further, field curvature can be favorably corrected, by the sixth lens L6 having a negative refractive power in the vicinity of the optical axis.

In addition, it is preferable for the sixth lens L6 to have a concave surface toward the image side in the vicinity of the optical axis. In this case, field curvature can be favorably corrected, while a shortening of the total length can be more favorably realized. In addition, the sixth lens L6 may be of a biconcave shape in the vicinity of the optical axis. In this case, increases in the incident angles of light rays that pass through the optical system at and enter the image formation plane (imaging element) can be favorably suppressed, particularly at intermediate angles of view, while securing the negative refractive power of the sixth lens L6. Alternatively, the sixth lens L6 may be of a meniscus shape having a concave surface toward the image side. In this case, such a configuration is advantageous from the viewpoint of shortening the total length of the lens.

In addition, it is preferable for the surface of the sixth lens L6 toward the image side to be of an aspherical shape having at least one inflection point at a position in an inwardly radial direction from the intersection of a principal light ray at a maximum angle of view and the surface of the sixth lens L6 toward the image side to the optical axis. By adopting this configuration, increases in the incident angles of light rays that pass through the optical system at and enter the image formation plane (imaging element) can be suppressed, particularly at the peripheral portions of the imaging region. In addition, distortion can be favorably corrected, by the surface of the sixth lens L6 toward the image side being of an aspherical shape having at least one inflection point at a position in an inwardly radial direction from the intersection of a principal light ray at a maximum angle of view and the surface of the sixth lens L6 toward the image side to the optical axis. Note that the "inflection point" on the surface of the sixth lens L6 toward the image side refers to a point at which the shape of the surface of the sixth lens L6 toward the image side changes from a convex shape to a concave shape (or from a concave shape to a convex shape) with respect to the image side. In addition, in the present specification, the expression "a position in an inwardly radial direction from the intersection of a principal light ray at a maximum angle of view and the surface toward the image side to the optical axis" refers to positions at the intersection of a principal light ray at a maximum angle of view and the surface toward the image side to the optical axis and positions radially inward toward the optical axis from these positions. The inflection point on the surface of the sixth lens L6 toward the image side may be provided at any position at the intersection of a principal light ray at a maximum angle of view and the surface of the sixth lens L6 toward the image side to the optical axis and at any position radially inward toward the optical axis from these positions.

In addition, in the case that each of the first lens L1 through the sixth lens L6 that constitute the imaging lens L is a single lens, the number of lens surfaces will be greater than that for a case in which any of the first lens L1 through the sixth lens L6 is a cemented lens. Therefore, the degree of freedom in the design of each lens will increase. As a result, shortening of the total length and increase in resolution will be facilitated.

According to the imaging lens L described above, the configurations of each of the first lens L1 through the sixth lens L6 are optimized as lens elements in a lens configuration having a total of six lenses. Therefore, a lens system that achieves a shortened total length while having a wide angle of view and securing a sufficient amount of back focus, which has high imaging performance from a central angle of view to peripheral angles of view so as to be compatible with imaging elements that satisfy demand for an increased number of pixels, can be realized.

It is preferable for at least one of the surfaces of each of the first lens L1 through the sixth lens L6 of the imaging lens L to be an aspherical surface, in order to improve performance.

Next, the operation and effects of conditional formulae related to the imaging lens L will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the combined focal length f56 of the fifth lens L5 and the sixth lens L6 and the focal length f of the entire system to satisfy Conditional Formula (1) below.

$$f/f56<0 \quad (1)$$

Conditional Formula (1) defines a preferable range of numerical values for the ratio of the combined focal length f56 of the fifth lens L5 and the sixth lens L6 with respect to the focal length f of the entire system. By securing the combined negative refractive power of the fifth lens L5 and the sixth lens L6 such that the value of f/f56 is not greater than or equal to the upper limit defined in Conditional Formula (1), the imaging lens L can be configured to be of a telephoto type, by considering the first lens L1 through the fourth lens L4 to be a positive first lens group, and the fifth lens L5 and the sixth lens L6 having negative refractive powers to be described later as a negative second lens group. As a result, the total length of the lens can be favorably shortened. In addition, by securing the combined negative refractive power of the fifth lens L5 and the sixth lens L6 such that the value of f/f56 is not greater than or equal to the upper limit defined in Conditional Formula (1), the Petzval sum can be decreased, which is advantageous from the viewpoint of widening the angle of view. It is preferable for the upper limit defined in Conditional Formula (1-1) to be satisfied, in order to cause these advantageous effects to become more prominent. In addition, by suppressing the combined negative refractive power of the fifth lens L5 and the sixth lens L6 such that the value of f/f56 is not less than or equal to the lower limit defined in Conditional Formula (1-1), the combined negative refractive power of the fifth lens L5 and the sixth lens L6 will not become excessively strong with respect to the refractive power of the entire system, and distortion can be favorably suppressed.

$$-4<f/f56<-0.1 \quad (1-1)$$

In addition, it is preferable for the focal length f of the entire system and the distance DDL from the surface of the first lens L1 toward the object side and the surface of the sixth lens L6 toward the image side along the optical axis to satisfy Conditional Formula (2) below.

$$0.7<DDL/f<0.98 \quad (2)$$

Conditional Formula (2) defines a preferable range of numerical values for the ratio of the distance DDL from the surface of the first lens L1 toward the object side and the surface of the sixth lens L6 toward the image side along the optical axis (total lens thickness) with respect to the focal length f of the entire system. By securing the distance DDL from the surface of the first lens L1 toward the object side and the surface of the sixth lens L6 toward the image side along the optical axis such that the value of DDL/f is not less than or equal to the lower limit defined in Conditional Formula (2), a first lens group having a positive refractive power, constituted by the first lens L1 through the fourth lens L4, and a second lens group having a negative refractive power, constituted by the fifth lens L5 and the sixth lens L6, can be favorably arranged apart from each other, in the case that the imaging lens L is considered to have a telephoto type configuration constituted by the first lens group and the second lens group. Such a configuration is advantageous from the viewpoint of shortening the total length of the lens. Suppressing the distance DDL from the surface of the first lens L1 toward the object side and the surface of the sixth lens L6 toward the image side along the optical axis such that the value of DDL/f is not greater than or equal to the upper limit defined in Conditional Formula (2) is advantageous from the viewpoint of securing a sufficient amount of back focus while shortening the total length of the lens. It is more preferable for Conditional Formula (2-1) to be satisfied, in order to cause these advantageous effects to become more prominent.

$$0.8<DDL/f<0.96 \quad (2-1)$$

In addition, it is preferable for the focal length f of the entire system and the refractive power P56 of an air lens formed between the surface of the fifth lens toward the image side and the surface of the sixth lens toward the object side to satisfy Conditional Formula (3) below.

$$0<f \cdot P56<2 \quad (3)$$

Here, P56 is obtained by Formula (P1) below.

$$P56 = \frac{1-Nd5}{L5r} + \frac{Nd6-1}{L6f} - \frac{(1-Nd5)\times(Nd6-1)\times D11}{L5r \times L6f} \quad (P1)$$

wherein Nd5 is the refractive index of the fifth lens with respect to the d line, Nd6 is the refractive index of the sixth lens with respect to the d line, L5r is the paraxial radius of curvature of the surface of the fifth lens toward the image side, L6f is the paraxial radius of curvature of the surface of the sixth lens toward the object side, and D11 is an air space distance between the fifth lens and the sixth lens along the optical axis.

Refractive power is an inverse of focal length. Therefore, if the focal length of the air lens formed between the surface of the fifth lens L5 toward the image side and the surface of the sixth lens L6 toward the object side is designated as f56a, Conditional Formula (3) defines a preferable range of numerical values for the ratio of the focal length f of the entire system with respect to the focal length f56a. By configuring the imaging lens such that the value of f·P56 is not less than or equal to the lower limit defined in Conditional Formula (3), the refractive power of the air lens formed between the surface of the fifth lens L5 toward the image side and the surface of the sixth lens L6 toward the object side will not be excessively weak. As a result, field curvature becoming excessively corrected can be suppressed. By configuring the imaging lens such that the value of f·P56 is not greater than or equal to the upper limit defined in Conditional Formula (3), the refractive power of the air lens formed between the surface of the fifth lens L5 toward the image side and the surface of the sixth lens L6 toward the object side will not be excessively strong. As a result, the generation of spherical aberration can be suppressed. It is more preferable for Conditional Formula (3-1) to be satisfied, in order to cause these advantageous effects to become more prominent.

$$0.1<f \cdot P56<1.27 \quad (3-1)$$

In addition, it is preferable for the focal length f of the entire system and the refractive power P45 of an air lens formed between the surface of the fourth lens L4 toward the image side and the surface of the fifth lens L5 toward the object side to satisfy Conditional Formula (4) below:

$$0 < f \cdot P45 < 1.7 \qquad (4)$$

Here, P45 is obtained by Formula (P2) below.

$$P45 = \frac{1 - Nd4}{L4r} + \frac{Nd5 - 1}{L5f} - \frac{(1 - Nd4) \times (Nd5 - 1) \times D9}{L4r \times L5f} \qquad (P2)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

Refractive power is an inverse of focal length. Therefore, if the focal length of the air lens formed between the surface of the fourth lens L4 toward the image side and the surface of the fifth lens L5 toward the object side is designated as f45a, Conditional Formula (4) defines a preferable range of numerical values for the ratio of the focal length f of the entire system with respect to the focal length f45a. By configuring the imaging lens such that the value of f·P45 is not less than or equal to the lower limit defined in Conditional Formula (4), the refractive power of the air lens formed between the surface of the fourth lens L4 toward the image side and the surface of the fifth lens L5 toward the object side will not be excessively weak. As a result, field curvature becoming excessively corrected can be suppressed. By configuring the imaging lens such that the value of f·P45 is not greater than or equal to the upper limit defined in Conditional Formula (4), the refractive power of the air lens formed between the surface of the fourth lens L4 toward the image side and the surface of the fifth lens L5 toward the object side will not be excessively strong. As a result, the generation of spherical aberration can be suppressed. It is more preferable for Conditional Formula (4-1) to be satisfied, in order to cause these advantageous effects to become more prominent.

$$0.32 < f \cdot P45 < 1.65 \qquad (4-1)$$

In addition, it is preferable for the focal length f5 of the fifth lens L5 and the focal length f of the entire system to satisfy Conditional Formula (5) below.

$$0 < f/f5 < 1 \qquad (5)$$

Conditional Formula (5) defines a preferable range of numerical values for the ratio of the focal length f of the entire system with respect to the focal length f5 of the fifth lens L5. By securing the refractive power of the fifth lens L5 such that the value of f/f5 is not less than or equal to the lower limit defined in Conditional Formula (5), the positive refractive power of the fifth lens L5 will not become excessively weak with respect to the refractive power of the entire system. As a result, sufficiently increasing the negative refractive power of the sixth lens L6, which is positioned at the image side of the fifth lens L5, is facilitated. Therefore, the total length of the lens can be favorably shortened, while favorably correcting astigmatism. In addition, by securing the refractive power of the fifth lens such that the value of f/f5 is not less than or equal to the lower limit defined in Conditional Formula (5), increases in the incident angles of light rays that pass through the optical system and enter the image formation plane (imaging element) can be suppressed, particularly at peripheral angles of view. By suppressing the refractive power of the fifth lens L5 such that the value of f/f5 is not greater than or equal to the upper limit defined in Conditional Formula (5), the positive refractive power of the fifth lens L5 will not become excessively strong with respect to the refractive power of the entire system. As a result, field curvature can be favorably corrected. It is more preferable for Conditional Formula (5-1) to be satisfied, in order to cause these advantageous effects to become more prominent.

$$0.01 < f/f5 < 0.98 \qquad (5-1)$$

In addition, it is preferable for the Abbe's number v2 of the second lens L2 with respect to the d line to satisfy Conditional Formula (6) below.

$$20 < v2 < 28 \qquad (6)$$

Conditional Formula (6) defines preferable values for the Abbe's number v2 of the second lens L2 with respect to the d line. By setting the Abbe's number v2 of the second lens L2 with respect to the d line such that it is not less than or equal to the lower limit defined in Conditional Formula (6), longitudinal chromatic aberration and lateral chromatic aberration can be corrected with favorable balance. In addition, setting the Abbe's number v2 of the second lens L2 with respect to the d line such that it is not greater than or equal to the upper limit defined in Conditional Formula (6) is advantageous from the viewpoint of correcting longitudinal chromatic aberration. It is more preferable for Conditional Formula (6-1) to be satisfied, in order to cause these advantageous effects to become more prominent.

$$21 < v2 < 25 \qquad (6-1)$$

In addition, it is preferable for the Abbe's number v5 of the fifth lens L5 with respect to the d line to satisfy Conditional Formula (7) below.

$$20 < v5 < 28 \qquad (7)$$

Conditional Formula (7) defines preferable values for the Abbe's number v5 of the fifth lens L5 with respect to the d line. Setting the Abbe's number v5 of the fifth lens L5 with respect to the d line such that it is not less than or equal to the lower limit defined in Conditional Formula (7) is advantageous from the viewpoint of correcting longitudinal aberration. In addition, by setting the Abbe's number v5 of the fifth lens L5 with respect to the d line such that it is not greater than or equal to the upper limit defined in Conditional Formula (7), longitudinal chromatic aberration and lateral chromatic aberration can be corrected with favorable balance. It is more preferable for Conditional Formula (7-1) to be satisfied, in order to cause these advantageous effects to become more prominent.

$$21 < v5 < 25 \qquad (7-1)$$

In addition, it is preferable for the focal length f1 of the first lens L1 and the focal length f of the entire system to satisfy Conditional Formula (8) below.

$$1 < f/f1 < 2 \qquad (8)$$

Conditional Formula (8) defines a preferable range of numerical values for the ratio of the focal length f of the entire system with respect to the focal length f1 of the first lens L1. By securing the refractive power of the first lens L1 such that the value of f/f1 is not less than or equal to the lower limit defined in Conditional Formula (8), the positive refractive power of the first lens L1 will not become excessively weak with respect to the refractive power of the entire system. As a result, a shortening of the total length of the lens can be favorably realized. By suppressing the refractive power of the first lens L1 such that the value of f/f1 is not greater than or equal to the upper limit defined in Conditional Formula (8), the positive refractive power of the first lens L1 will not become excessively strong with respect to the refractive power of the entire system. As a result, spherical aberration and astigmatism can be favorably corrected.

In addition, it is preferable for the focal distance f of the entire system, the half angle of view ω when in a state of focus on an object at infinity, and the paraxial radius of curvature L6r of the surface of the sixth lens L6 toward the image side to satisfy Conditional Formula (9) below.

$$0.5 < f \cdot \tan \omega / L6r < 20 \quad (9)$$

Conditional Formula (9) defines a preferable range of numerical values for the ratio of a paraxial image height (f·tan ω) with respect to the paraxial radius of curvature L6r of the surface of the sixth lens L6 toward the image side. By setting the paraxial image height (f·tan ω) with respect to the paraxial radius of curvature L6r of the surface of the sixth lens L6 toward the image side such that the value of f·tan ω/L6r is not less than or equal to the lower limit defined in Conditional Formula (9), the absolute value of the paraxial radius of curvature L6r of the surface of the sixth lens L6 toward the image side, which is the surface most toward the image side in the imaging lens L, will not be excessively large with respect to the paraxial image height (f·tan ω). Thereby, field curvature can be sufficiently corrected while realizing a shortening of the total length. Note that field curvature can be favorably corrected from a central angle of view to peripheral angles of view in the case that in the case that the sixth lens L6 is of an aspherical shape having a concave surface toward the image side and at least one inflection point as illustrated in the imaging lenses L of each of the Examples, and in the case that the lower limit of Conditional Formula (9) is satisfied. Therefore, this configuration facilitates realization of a wide angle of view. In addition, by setting the paraxial image height (f·tan ω) with respect to the paraxial radius of curvature L6r of the surface of the sixth lens L6 toward the image side such that the value of f·tan ω/L6r is not greater than or equal to the upper limit defined in Conditional Formula (9), the absolute value of the paraxial radius of curvature L6r of the surface of the sixth lens L6 toward the image side, which is the surface most toward the image side in the imaging lens, will not be excessively small with respect to the paraxial image height (f·tan ω). Thereby, increases in the incident angle of light rays that pass through the optical system and enter the image formation plane (imaging element) can be suppressed, particularly at intermediate angles of view. In addition, field curvature becoming excessively corrected can be suppressed.

Here, three preferred examples of configurations of the imaging lens L and the advantageous effects obtained thereby will be described. Note that these preferred examples may adopt the preferred configurations of the imaging lens L described above as appropriate.

The first preferred example of the imaging lens L consists essentially of six lenses, including: a first lens L1 of a biconvex shape; a second lens L2 having a negative refractive power and is of a meniscus shape with a concave surface toward the image side; a third lens L3 of a meniscus shape with a convex surface toward the object side; a fourth lens L4 of a meniscus shape with a concave surface toward the object side; a fifth lens L5 having a positive refractive power; and a sixth lens L6 having a negative refractive power and a concave surface toward the image side, provided in this order from the object side. According to this first example, spherical aberration in particular can be favorably corrected, because the first lens L1 is of a biconvex shape in the vicinity of the optical axis. In addition, the total length of the lens can be favorably shortened, because the second lens L2 is of a meniscus shape with a concave surface toward the image side in the vicinity of the optical axis. In addition, astigmatism can be favorably corrected, because the fourth lens L4 is of a meniscus shape with a concave surface toward the object side in the vicinity of the optical axis. Note that Examples 1 through 7 of the present specification correspond to the first preferred example of the configuration of the imaging lens.

The second preferred example of the imaging lens L consists essentially of six lenses, including: a first lens L1 having a positive refractive power and a convex surface toward the object side; a second lens L2 having a negative refractive power and is of a meniscus shape with a concave surface toward the image side; a third lens L3 of a meniscus shape with a convex surface toward the object side; a fourth lens L4; a fifth lens L5 having a positive refractive power; and a sixth lens L6 having a negative refractive power and a concave surface toward the image side, provided in this order from the object side. The second preferred example of the imaging lens L satisfies Conditional Formulae (1) and (2). According to the second preferred example of the imaging lens L, the total length of the lens can be favorably shortened, because the second lens L2 is of a meniscus shape having a concave surface toward the image side in the vicinity of the optical axis. In addition, the second preferred example of the imaging lens L satisfies Conditional Formula (1), which is particularly advantageous from the viewpoints of shortening the total length of the lens and widening the angle of view. In addition, a sufficient amount of back focus can be favorably secured while shortening the total length of the lens, because the second preferred example of the imaging lens L satisfies Conditional Formula (2). Note that Examples 1 through 7 of the present specification correspond to the second preferred example of the configuration of the imaging lens.

The third preferred example of the imaging lens L consists essentially of six lenses, including: a first lens L1 having a positive refractive power and a convex surface toward the object side; a second lens L2 having a negative refractive power and a concave surface toward the image side; a third lens L3 of a meniscus shape with a convex surface toward the object side; a fourth lens L4 having a positive refractive power; a fifth lens L5 having a positive refractive power; and a sixth lens L6 having a negative refractive power and a concave surface toward the image side, provided in this order from the object side. The third preferred example of the imaging lens L satisfies Conditional Formulae (1) and (2). According to the third preferred example of the imaging lens L, spherical aberration can be favorably corrected, because the fourth lens L4 has a positive refractive power. In addition, the third preferred example of the imaging lens L satisfies Conditional Formula (1), which is particularly advantageous from the viewpoints of shortening the total length of the lens and widening the angle of view. In addition, a sufficient amount of back focus can be favorably secured while shortening the total length of the lens, because the third preferred example of the imaging lens L satisfies Conditional Formula (2). Note that Examples 1 through 3, 5, and 6 of the present specification correspond to the third preferred example of the configuration of the imaging lens.

As described above, in the imaging lens L according to the embodiments of the present invention, the configurations of each lens element is optimized in a lens configuration having a total of six lenses. Therefore, a lens system that achieves a shortened total length while having a wide angle of view and securing a sufficient amount of back focus, which has high imaging performance from a central angle of view to peripheral angles of view so as to be compatible with imaging elements that satisfy demand for an increased number of pixels, can be realized.

In addition, in the case that the lens configurations of each of the first lens L1 through the sixth lens L6 are set such that the maximum angle of view in a state focused on an object at infinity is 73 degrees or greater and back focus Bf is 1.07 or greater as in the imaging lenses of the first through seventh embodiments, a widening of the angle of view and a shortening of the total length of the lens can be achieved while favorably securing a sufficient amount of back focus, and the imaging lens L may be favorably applied for use in imaging apparatuses such as cellular telephones.

Further improved imaging performance can be realized by satisfying the above preferred conditions as appropriate. In addition, the imaging apparatuses according to the embodiments of the present invention output image signals corresponding to optical images formed by the high performance imaging lenses according to the embodiments of the present invention. Therefore, photographed images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column vdj.

Table 1 also shows the aperture stop St and the optical member CG. In Table 1 "(St)" is indicated along with a surface number in the row of the surface number of the surface that corresponds to the aperture stop St, and "(IMG)" is indicated along with a surface number in the row of the surface number of the surface that corresponds to the imaging surface. The signs of the radii of curvature are positive for surface shapes having convex surfaces toward the object side, and negative for surface shapes having convex surfaces toward the image side. Note that the values of the focal length f (mm) of the entire system, the back focus Bf (mm), the F number Fno. and the maximum angle of view $2\omega(°)$ in a state focused on an object at infinity are shown as data above the lens data. Note that the back focus Bf is represented as an air converted value.

In the imaging lens of Example 1, both of the surfaces of the first lens L1 through the sixth lens L6 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "1.0·10⁻²".

The values of coefficients An and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = \frac{C \times h^2}{1 + \sqrt{1 - KA \times C^2 \times h^2}} + \sum_n An \times h^n \tag{A}$$

wherein: Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 3 or greater), and KA is an aspherical surface coefficient.

Specific lens data corresponding to the configurations of the imaging lenses illustrated in FIG. 2 through FIG. 7 are shown in Table 3 through Table 14 as Example 2 through Example 7. In the imaging lenses of Examples 1 through 7, both of the surfaces of the first lens L1 through the sixth lens L6 are all aspherical surfaces.

Figure 9:
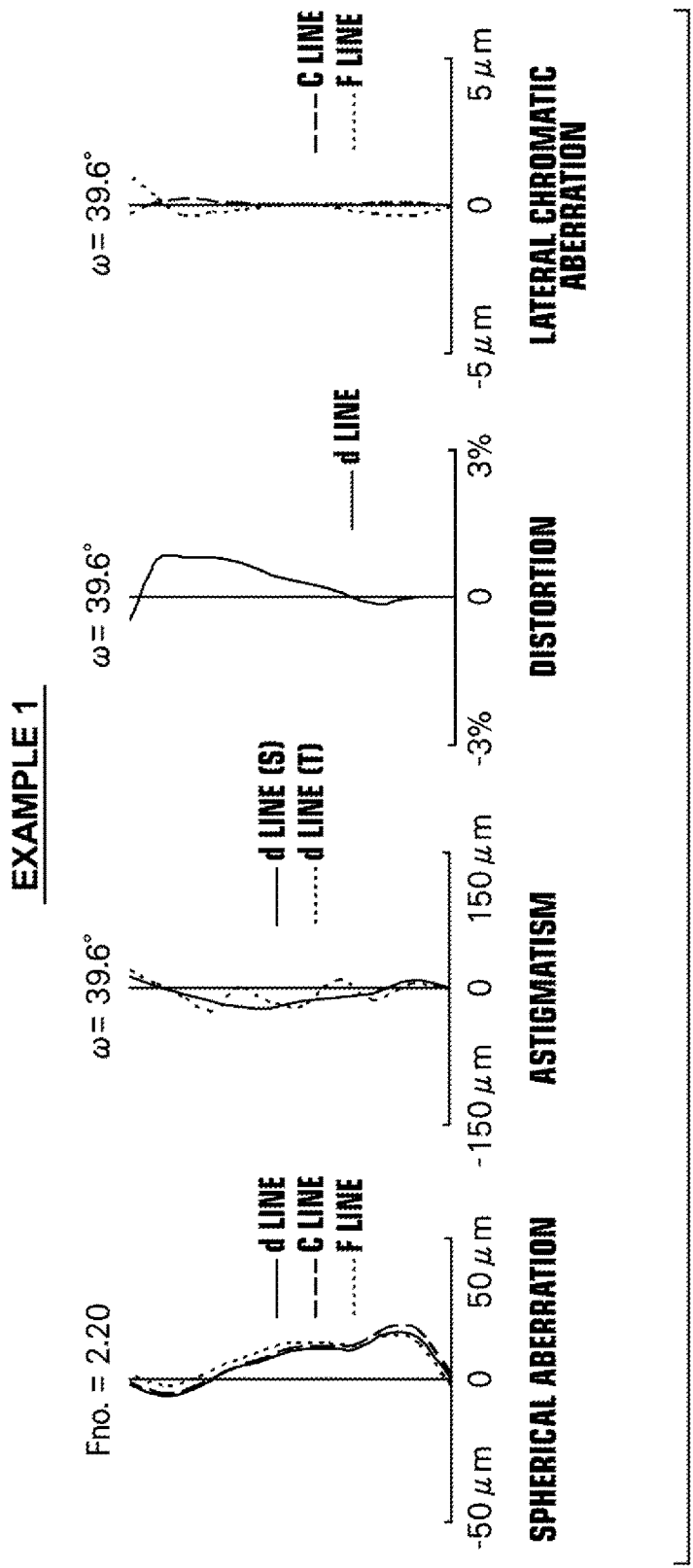
FIG. 9 is a collection of diagrams that illustrate aberrations of the imaging lens of Example 1, wherein the diagrams illustrate spherical aberration, astigmatism, distortion, and lateral chromatic aberration, in this order from the left side of the drawing sheet.
Figure 10:
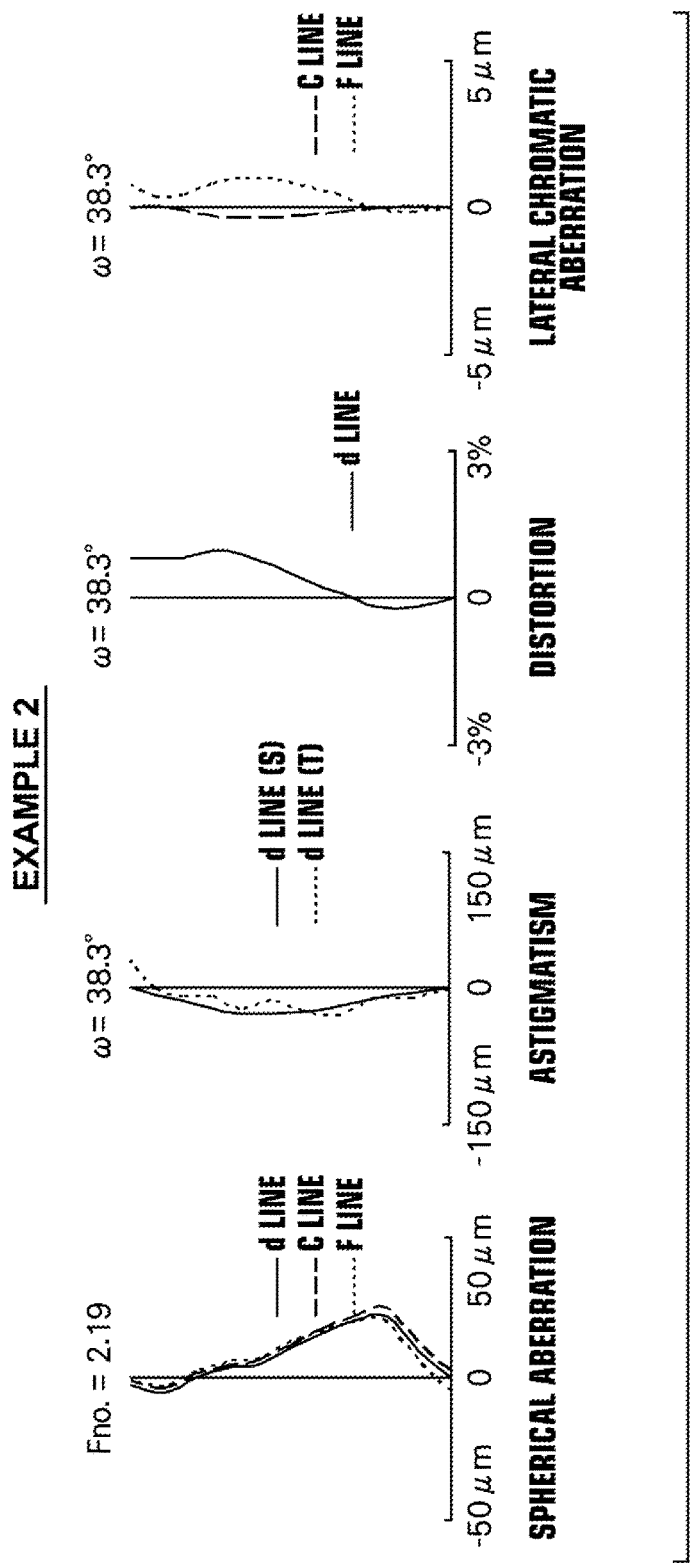
FIG. 10 is a collection of diagrams that illustrate aberrations of the imaging lens of Example 2, wherein the diagrams illustrate spherical aberration, astigmatism, distortion, and lateral chromatic aberration, in this order from the left side of the drawing sheet.
Figure 11:
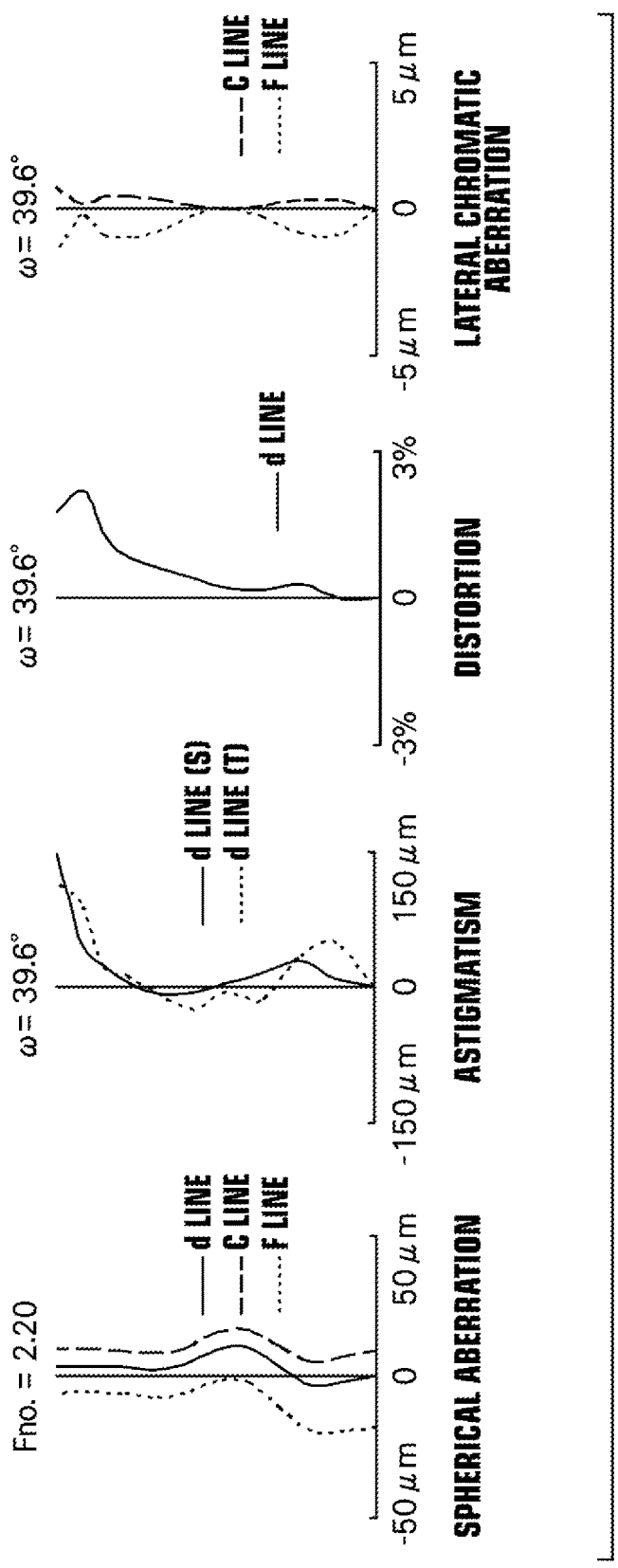
FIG. 11 is a collection of diagrams that illustrate aberrations of the imaging lens of Example 3, wherein the diagrams illustrate spherical aberration, astigmatism, distortion, and lateral chromatic aberration, in this order from the left side of the drawing sheet.
Figure 12:
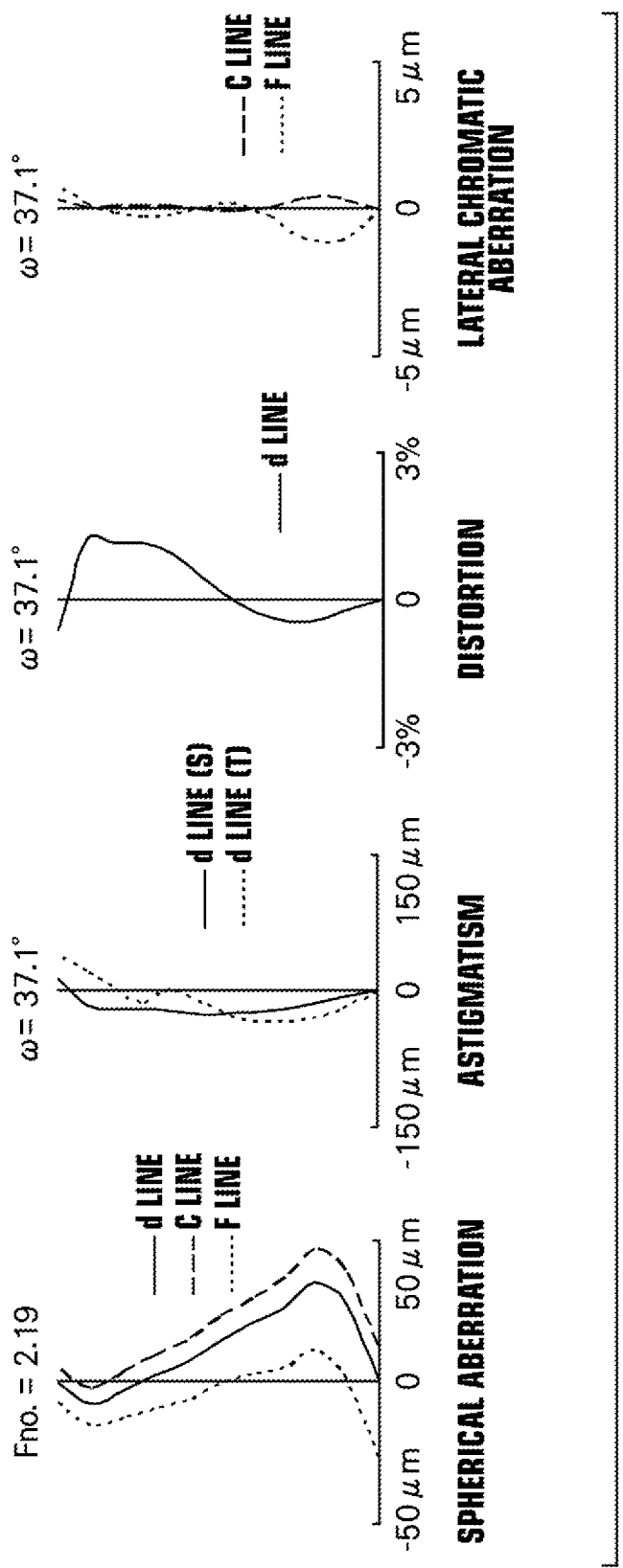
FIG. 12 is a collection of diagrams that illustrate aberrations of the imaging lens of Example 4, wherein the diagrams illustrate spherical aberration, astigmatism, distortion, and lateral chromatic aberration, in this order from the left side of the drawing sheet.
Figure 13:
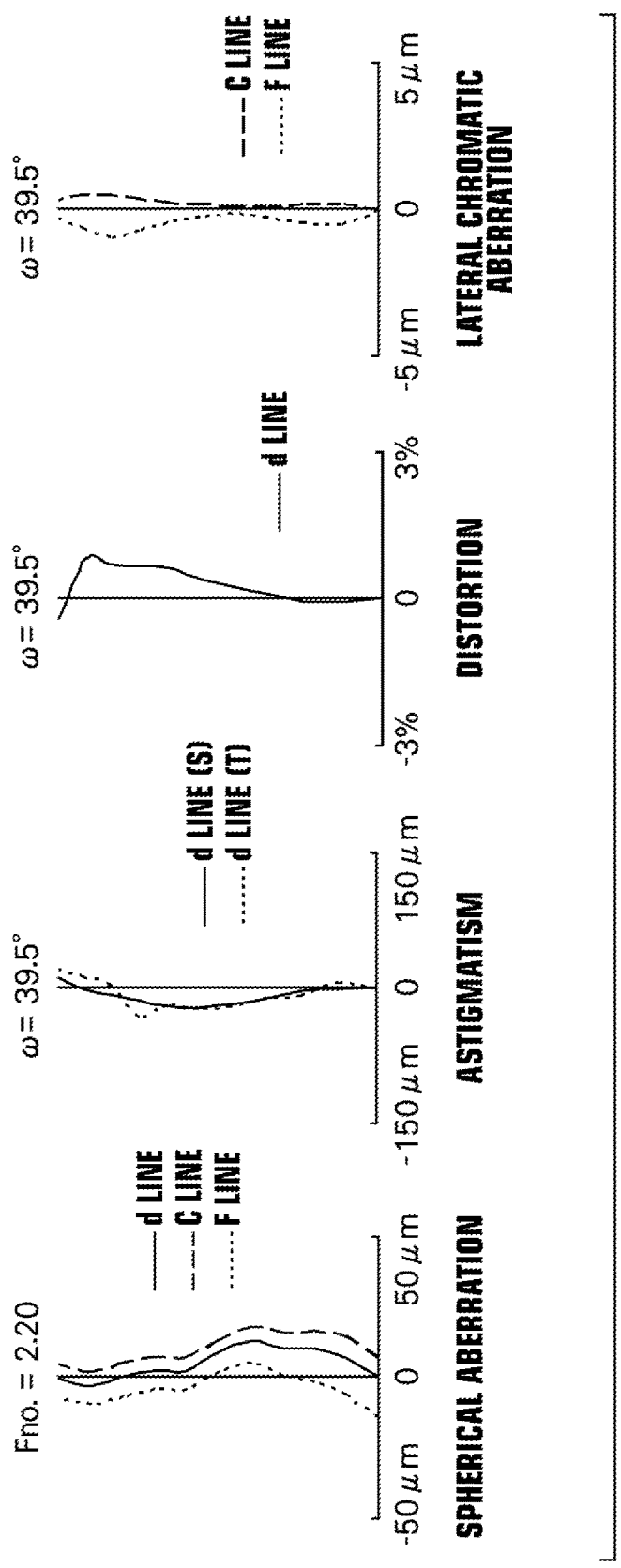
FIG. 13 is a collection of diagrams that illustrate aberrations of the imaging lens of Example 5, wherein the diagrams illustrate spherical aberration, astigmatism, distortion, and lateral chromatic aberration, in this order from the left side of the drawing sheet.
Figure 14:
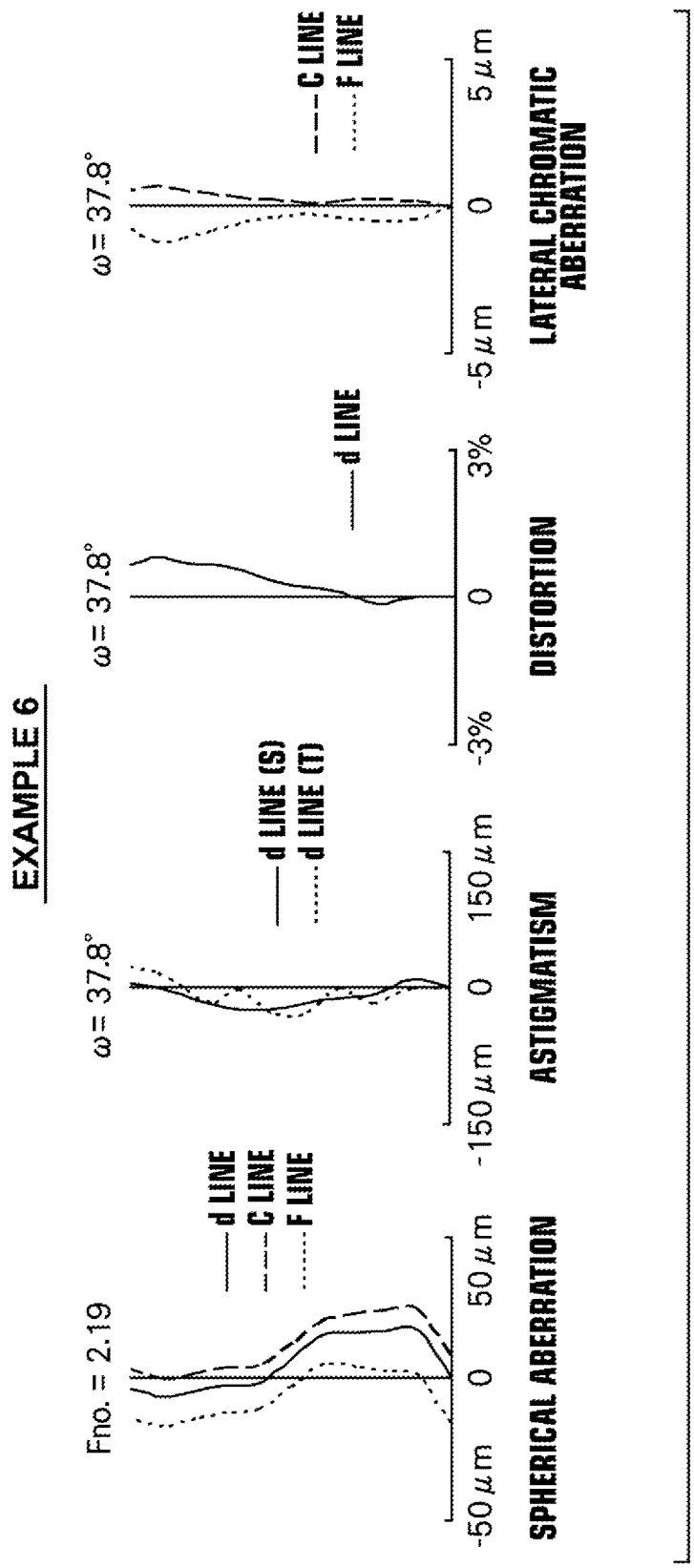
FIG. 14 is a collection of diagrams that illustrate aberrations of the imaging lens of Example 6, wherein the diagrams illustrate spherical aberration, astigmatism, distortion, and lateral chromatic aberration, in this order from the left side of the drawing sheet.
Figure 15:
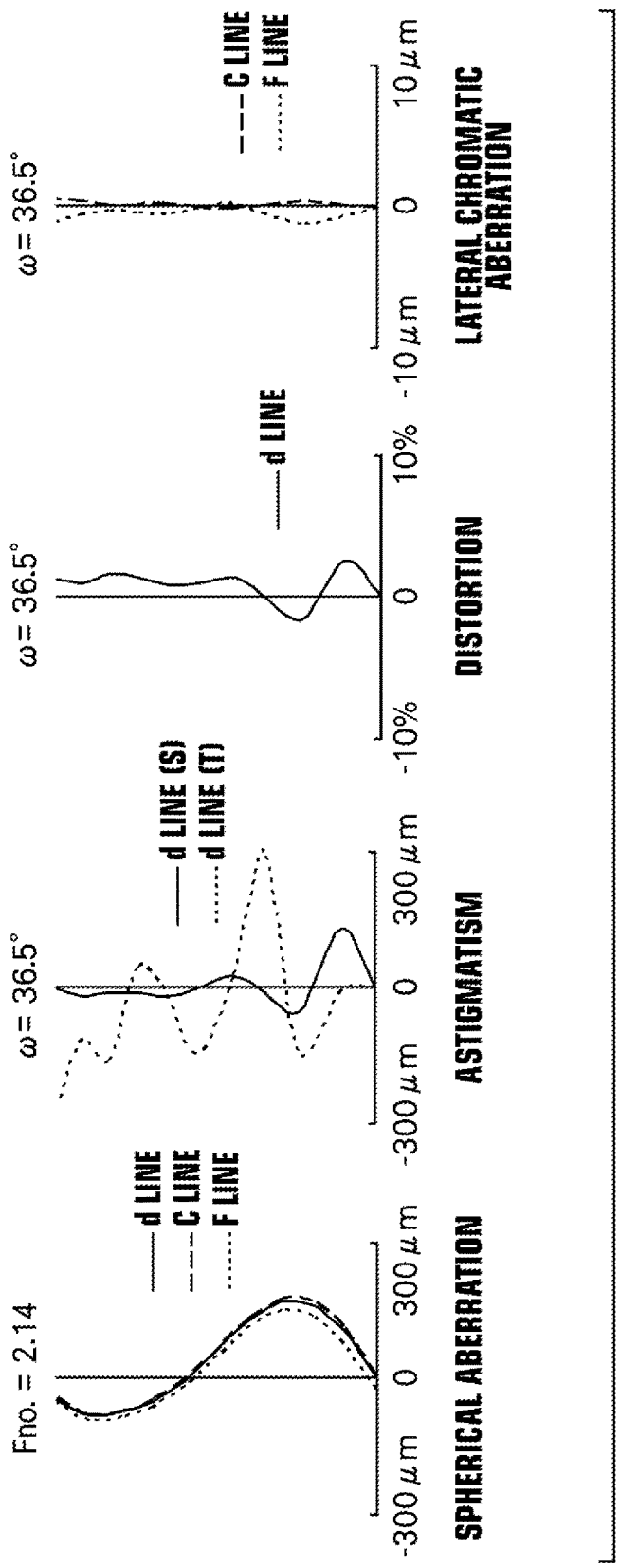
FIG. 15 is a collection of diagrams that illustrate aberrations of the imaging lens of Example 7, wherein the diagrams illustrate spherical aberration, astigmatism, distortion, and lateral chromatic aberration, in this order from the left side of the drawing sheet.

FIG. 9 is a collection of diagrams that illustrate aberrations of the imaging lens of Example 1, wherein the diagrams illustrate the spherical aberration, the astigmatism, the distortion, and the lateral chromatic aberration (chromatic aberration of magnification) of the imaging lens of Example 1, respectively, in this order from the left side of the drawing sheet. Each of the diagrams that illustrate the spherical aberration, the astigmatism (field curvature), and the distortion illustrate aberrations using the d line (wavelength: 587.6 nm) as a reference wavelength. The diagram that illustrates spherical aberration also shows aberrations related to the F line (wavelength: 486.1 nm), the C line (wavelength: 656.3 nm) and the g line (wavelength: 435.8 nm). The diagram that illustrates lateral chromatic aberration shows aberrations related to the F line, the C line, and the g line. In the diagram that illustrates astigmatism, aberration in the sagittal direction (S) is indicated by a solid line, while aberration in the tangential direction (T) is indicated by a broken line. In addition, "Fno." denotes F numbers, and "ω" denotes a half value of the maximum angle of view in a state focused on an object at infinity.

Similarly, the aberrations of the imaging lens of Example 2 through Example 7 are illustrated in FIG. 10 through FIG. 15. The diagrams that illustrate aberrations of FIG. 10 through FIG. 15 are all for cases in which the object distance is infinity.

Table 15 shows values corresponding to Conditional Formulae (1) through (9) respectively summarized for each of Examples 1 through 7.

As can be understood from each set of numerical value data and from the diagrams that illustrate aberrations, each of the Examples realize a shortening of the total length of the lens, a widened angle of view, and high imaging performance.

Hereinafter, preferred embodiments related to the shapes of flange surfaces which are formed around the peripheries of the optical surfaces of the individual lenses having desired optical performance that constitute the imaging lens.

Commonly, imaging devices such as digital still cameras, cellular telephones, smart phones, and tablet type terminals generally include: a lens unit equipped with an imaging lens constituted by a cylindrical lens barrel formed by metal or plastic and a plurality of lenses which are positioned within the lens barrel; and an imaging unit having an integrated imaging element provided at the image formation plane (imaging surface) of the imaging lens.

Various techniques have been proposed to reduce the occurrence of flares and ghosts, caused by unnecessary light rays entering an imaging element in an imaging device that employs an imaging lens constituted by a plurality of lenses such as that described above. For example, Japanese Unexamined Patent Publication No. 2011-221136 discloses that the surface of a region at the periphery of an optical functioning region of an optical lens is formed by a flat surface which is substantially perpendicular to the optical axis and an inclined surface which is inclined with respect to the optical axis, provided in this order from the outer periphery inward, and that the flat surface which is substantially perpendicular to the optical surface has a roughened surface. Japanese Unexamined Patent Publication No. 2005-309289 discloses that a plurality of annular protrusions and recesses and a flat surface which is substantially perpendicular to the optical axis are provided on a surface about the periphery of the effective diameter of an optical lens. Japanese Unexamined Patent Publication Nos. 2011-242504 and 2013-68857 disclose that an inclined surface which is not perpendicular to the optical axis is provided on a surface about the periphery of the effective diameter of an optical lens. Taiwanese Patent Publication No. 201337340 discloses that a plurality of annular protrusions and recesses having a predetermined cross sectional shape are provided on a surface about the periphery of the effective diameter of an optical lens.

Here, a flange surface which is applied to one or more lenses that constitute an imaging lens that favorably reduces the generation of flares and ghosts will be proposed. Particularly, a flange surface that can be favorably applied to imaging lenses for use in comparatively compact imaging devices such as cellular telephones, smart phones, and tablet type terminals, which are required to be compact and compatible with an increased number of pixels, will be proposed.

A lens LA, which is a lens in which a preferred flange surface is applied to one of the lenses that constitute the imaging lens L of the present invention, will be described as an eighth embodiment of the present invention.

An imaging lens L of the eighth embodiment is equipped with: a first lens L1, a second lens L2 (the lens LA of the present embodiment), a third lens L3, a fourth lens L4, a fifth lens L5, and a sixth lens L6, provided in this order from the object side. The imaging lens L is further equipped with an aperture stop St positioned at the object side of the surface of the first lens L1 toward the object side, a stop St2 for cutting flare positioned between the first lens L1 and the second lens, and a stop St3 for cutting flare positioned between the second lens L2 and the third lens L3. When the imaging lens L is assembled, the first lens L1 through the sixth lens L6 and the stops St, St2, and St3 to be interposed among the lenses are inserted into a lens barrel (not shown) in a predetermined order. In the imaging lens L, the lenses L1 through L6 are positioned at desired positions in the direction of the optical axis in a state in which the optical axes of the lenses L1 through L6 are aligned, by outer peripheral surfaces 30 and flange surfaces 20 of the lenses L1 through L6 being clamped by abutting portions of the inner wall of the lens barrel and the flange surfaces of adjacent lenses (or adjacent stops). Note that the shapes of the optical surfaces and the detailed arrangement of the lenses L1 through L6 of the imaging lens L of the eighth embodiment are the same as those of the imaging lens L illustrated in FIG. 1. Here, descriptions of portions which are common with those of the imaging lens L illustrated in FIG. 1 will be omitted in order to avoid redundant descriptions, and the portions toward the outer periphery of the optical surfaces of the lenses will be described in detail.

FIG. 18 is a sectional diagram that schematically illustrates the lens LA, which is a modification of the second lens L2 of a meniscus shape having a concave surface toward the image side illustrated in FIG. 1 and of which the portion toward the outer periphery of the optical surface is different from that of the second lens L2 of FIG. 1. FIG. 19 is a diagram that illustrates the relative arrangement between the lens LA, the stop St2, and the stop St3. Note that the units of the numerical values that indicate dimensions in FIGS. 18 and 19 are mm. As illustrated in FIG. 19, in the eighth embodiment, the stop St2 positioned at the object side of the lens LA is configured such that the inner diameter thereof is substantially the same as the effective diameter of the surface of the lens LA toward the object side, while the stop St3 positioned at the image side of the lens LA is configured such that the inner diameter thereof is greater than the effective diameter of the surface of the lens LA toward the object side. In FIG. 19, Ef denotes the half value of the effective diameter of the surface of the lens LA toward the object side, Efs denotes the half value of the inner diameter of the stop St2, Er denotes the half value of the effective diameter of the surface of the lens LA toward the image side, and Ers denotes the half value of the inner diameter of the stop St3. Note that FIGS. 18 and 19 are schematic diagrams for explaining an example of the flange surface of the eighth embodiment, and the detailed shapes of the lens surfaces are different from those illustrated in the sectional diagram of FIG. 1.

The lens LA has optical surfaces 10, which are lens surfaces formed within the effective diameter to become desired lens shapes with respect to the optical axis, an outer peripheral surface 30, and flange surfaces 20 formed toward the outer peripheries of the optical surfaces that connect the optical surfaces 10 and the outer peripheral surface 30. The outer peripheral surface 30 is a surface that abuts the inner wall of a lens barrel (not shown) when the imaging lens L is configured as a lens unit. The surface of the lens LA toward the object side is constituted by an optical surface 10f, which is the lens surface toward the object side, and a flange surface 20f, which is a surface that connects the optical surface 10f with the outer peripheral surface 30. In addition, the surface of the lens LA toward the image side is constituted by an optical surface 10r, which is the lens surface toward the image side, and a flange surface 20r, which is a surface that connects the optical surface 10r with the outer peripheral surface 30.

It is preferable for the flange surfaces 20 to have one or more arcuate groove portions 21 at positions as close as possible to the optical surfaces 10. For example, if the length from the edge of the effective diameter to the edge of the lens in the radial direction is designated as CL, it is preferable for at least a portion of an arcuate groove portion 21 to be positioned within a region at 0.5·CL or less from the inner peripheral side of the flange surface 20r, and more preferably within a region at 0.4·CL or less. Meanwhile, it is preferable for the inner peripheral edge of the arcuate groove portions 21 to be positioned away from the optical surfaces 10 to a degree that light rays that contribute to image formation will not enter the arcuate groove portions 21, even if manufacturing errors occur.

Note that the arcuate groove portions 21 of the present specification may be of any arbitrary shape, as long as they are recessed grooves that extend along the arc of a circle having the optical axis as its center and function to refract or reflect unnecessary light such that the unnecessary light does not enter an imaging element. For example, the arcuate groove portions 21 may be of approximate U shapes having semicircular cross sections, or may be of approximate V shapes. In addition, the inner walls of each of the arcuate groove portions that extend in the circumferential direction may be constituted by two or more flat surfaces, constituted by one or more smooth curved surfaces, or constituted by a combination of flat surfaces and curved surfaces. As a further alternative, the arcuate groove portions may have the cross sectional shapes disclosed in Taiwanese Patent Publication No. 201337340.

The flange surface 20r toward the image side of the lens LA of the eighth embodiment has a first arcuate groove portion 21ra in the vicinity of the optical surface 10r and a second arcuate groove portion 21rb provided toward the outer peripheral side of the first arcuate groove portion 21ra. In addition, the flange surface 20f toward the object side of the lens LA has a first arcuate groove portion 21fa in the vicinity of the optical surface 10f, a second arcuate groove portion 21fb provided toward the outer peripheral side of the first arcuate groove portion 21fa, and a third arcuate groove portion 21fc provided toward the outer peripheral side of the first arcuate groove portion 21fb.

In the case that the flange surfaces 20 are equipped with the first arcuate groove portions 21a (21ra and 21fa) in the vicinities of the optical surfaces 10 where unnecessary light is likely to enter, as in the eighth embodiment, the unnecessary light can be favorably reflected or diffused by the first arcuate groove portions 21a. In addition, by providing a plurality of arcuate groove portions 21 (21ra, 21rb, 21fa, 21fb, and 21fc) in the vicinities of the optical surfaces 10, a greater number of surfaces having normal lines that extend in different directions from each other can be provided at positions where unnecessary light is likely to enter. For this reason, the unnecessary light can be more favorably reflected or diffused.

In addition, in the case that a plurality of arcuate groove portions 21 are provided adjacent to each other, it is preferable for the intervals among the reference positions of a plurality of arcuate groove portions 21b to be 0.1·CL or greater and 0.3·CL or less, when the length from the edge of the effective diameter to the edge of the lens in the radial direction is designated as CL. In this case, the plurality of adjacent arcuate groove portions 21 (21ra and 21rb, or 21fa, 21fb, and 21fc) can favorably reflect or diffuse unnecessary light. For example, the distance between the deepest position in the direction of the optical axis within the first arcuate groove portion 21ra and the deepest position in the direction of the optical axis within the second arcuate groove portion 21rb is 0.16·CL on the surface toward the image side of the lens LA of the eighth embodiment, as illustrated in FIG. 19. In addition, the distance between the deepest position in the direction of the optical axis within the second arcuate groove portion 21fb and the deepest position in the direction of the optical axis within the third arcuate groove portion 21fc is 0.2·CL on the surface toward the object side of the lens LA of the eighth embodiment. Note that the reference positions of the arcuate groove portions 21 are representative positions of the arcuate groove portions in the radial direction. Examples of the reference position include the deepest positions in the direction of the optical axis within the arcuate groove portions 21, the positions of the end points of the arcuate groove portions 21, and the center positions in the width directions of the arcuate grooves.

In addition, in the eighth embodiment, the arcuate groove portions 21 are provided at positions of the flange surface 20r toward the image side and the flange surface 20f toward the object side that face each other. In this case, unnecessary light which has reached the surface of the lens LA toward the image side from the object side can be reflected in a direction that does not contribute to image formation or diffused by the arcuate groove portions 21ra and 21rb on the image side. At the same time, unnecessary light which has reached the surface of the lens LA toward the object side after being repetitively reflected can be further reflected in a direction that does not contribute to image formation or diffused by the arcuate groove portions 21a and 21fb on the object side.

In addition, it is preferable for a plurality of arcuate groove portions 21 to be configured such that the depths in the optical direction to be shallower within arcuate groove portions 21 which are positioned farther away from the optical axis in the case that the flange surfaces 20 are provided with a plurality of adjacent arcuate groove portions 21, as illustrated in FIG. 18. In this case, the plurality of arcuate groove portions 21 which are adjacent to each other can more favorably reflect unnecessary light in directions that will not contribute to image formation, and reduce the occurrence of unnecessary light reaching the imaging element. In the example illustrated in FIG. 18, the depths in the direction of the optical axis of the arcuate groove portions 21r on the image side become shallower in order from the first arcuate groove portion 21ra to the second arcuate groove portion 21rb. Similarly, the depths in the direction of the optical axis of the arcuate groove portions 21f on the object side become shallower in order from the first arcuate groove portion 21fa, the second arcuate groove portion 21fb, to the third arcuate groove portion 21fc.

Note that the flange surfaces 20f and 20r are not limited to the embodiment above, and may be provided with a desired number of arcuate groove portions 21. For example, the second arcuate groove portion 21rb may be omitted from the flange surface 20r of the eighth embodiment, and one or more other arcuate groove portions may be provided. In addition, the second and third arcuate groove portions 21fb and 21fc may be omitted from the flange surface 20f of the eighth embodiment, and one or more other arcuate groove portions may be provided. In addition, the numbers, the shapes, and the positions of the arcuate groove portions on the surface toward the image side and the surface toward the object side may be changed as appropriate.

In addition, it is preferable for the arcuate groove portions 21 to be configured by smooth curved surfaces. In the case that the arcuate groove portions 21 (21*ra*, 21*rb*, 21*fa*, 21*fb*, and 21*fc*) are constituted by curved surfaces having approximately U shaped cross sections as illustrated in FIG. 8, a great number of locally inclined surfaces which are inclined with respect to the optical axis at various angles can be provided. As a result, unnecessary light that enters the flange surfaces 20 at various angles can be favorably reflected or diffused. Note that the arcuate groove portions 21 may be of any curved shape constituted by smooth curved surfaces in order for the above advantageous effect to be exhibited. The above advantageous effect can also be exhibited at portions constituted by curved surfaces if the arcuate groove portions 21 are partially constituted by smooth curved surfaces and include both flat surfaces and curved surfaces.

In addition, in the case that the flange surfaces 20 are provided with a plurality of arcuate groove portions 21 adjacent to each other, it is preferable for the plurality of arcuate groove portions 21 to be connected by smooth curved surfaces (for example, the portion between the arcuate groove portions 21*ra* and 21*rb*, the portion between the arcuate groove portions 21*fa* and 21*fb*, and portion between the arcuate groove portions 21*fb* and 21*fc*). It is also preferable for the arcuate groove portions 21 to be connected to the surrounding surfaces by smooth curved surfaces. By providing a greater number of portions formed as smooth curved surface on the flange surfaces 20, a greater number of locally inclined surfaces which are inclined with respect to the optical axis at various angles can be provided. As a result, unnecessary light that enters the flange surfaces 20 at various angles can be more favorably reflected or diffused.

It is preferable for the depths in the direction of the optical axis of the grooves of the arcuate groove portions 21 to be set such that a predetermined thickness (for example 500 μm or greater in the direction of the optical axis) can be secured as the thickness of the flange portion of the imaging lens L (the shortest distance between the flange surface 20*f* toward the object side to the flange surface 20*r* toward the image side in the direction of the optical axis). As an example, it is preferable for the depth in the direction of the optical axis of the arcuate groove portions 21 of an imaging lens L which is applied to miniature imaging devices such as cellular telephones to be 150 μm or less, and more preferably 100 μm or less. In this case, the thickness of the flange portion of the lens LA can be maintained so as to not become excessively strong, and the strength of the lens LA can be secured, which is advantageous from the viewpoint of lens production.

Further, in the case that the arcuate groove portions 21 have depths in the direction of the optical axis of 100 μm or less, widths in the radial direction within a range from 100 μm to 200 μm, and are constituted by smooth curved surfaces as in the eighth embodiment, production of the lens LA by extrusion molding will be facilitated, while realizing the advantageous effect of reflecting or diffusing unnecessary light by the arcuate groove portions 21. In addition, the thickness in the direction of the optical axis of the flange portion of the lens can be maintained, and the strength of the lens LA can be favorably secured. According to the eighth embodiment, the flange surfaces 20 satisfy the aforementioned ranges for the depths in the direction of the optical axis and the widths in the radial direction, are provided with the arcuate groove portions 21 constituted by curved surfaces, and have three or fewer arcuate groove portions 21. For this reason, the flange surfaces 20 can be formed to be simple shapes, and shapes which are more suited for facilitated production by extrusion molding can be realized. In addition, the flange surfaces 20 satisfy the aforementioned ranges for the depths in the direction of the optical axis and the widths in the radial direction, and are provided with two or more arcuate groove portions 21 constituted by curved surfaces. Therefore, the advantageous effect of the arcuate groove portions 21 reflecting or diffusing unnecessary light can be favorably secured without causing depths in the direction of the optical axis of each individual arcuate grooved portion 21 to become excessively deep. Further, the strength of the flange portion of the lens LA, the reflecting or diffusing effect with respect to unnecessary light, and realization of shapes which are easy to produce can be achieved.

In addition, it is preferable for flat surface portions 22 (22*r* and 22*0*, which are substantially planar surfaces that are perpendicular to the optical axis, to be provided at the flange surfaces 20 toward the outer peripheries of the arcuate groove portions 21 (21*ra*, 21*rb*, and 21*fc*) which are provided adjacent to each other. By the flange surfaces 20 being provided with the flat surface portions 22 which are perpendicular to the optical axis, the flat surface portions 22 of the lens LA can firmly abut the stops St2 and St3 (the flange surface of an adjacent lens in the case that the stops St are not provided), and the lens LA can be stably clamped in the direction of the optical axis.

In addition, there are cases in which unnecessary light reaches the outer peripheral surface 30 then enter the imaging element by being reflected at the outer peripheral surface 30, thereby causing ghosts and flares to be generated. For this reason, it is preferable for the flange surfaces 20 to have inclined surfaces which are inclined the optical axis at the peripheral portions 24 thereof. In this case, the inclined surfaces reflect or diffuse unnecessary light in the vicinity of the outer peripheral surface 30 to decrease the occurrence of unnecessary light reaching the outer peripheral surface 30, thereby reducing the generation of ghosts and flares caused by unnecessary light being reflected at the outer peripheral surface 30. If the length from the edge of the effective diameter to the edge of the lens in the radial direction is designated as CL, the peripheral portions 24 may be regions which are within a range of 0.2·CL from the peripheral edge of the flange surface 20*r*. In addition, it is preferable for the peripheral portions 24 to be constituted by curved surfaces. In this case, a plurality of locally inclined surfaces which are inclined with respect to the optical axis at various angles can be provided at the peripheral portions 24. As a result, unnecessary light that enters the vicinity of the outer peripheral surface 30 at various angles can be favorably reflected or reduced, and the occurrence of unnecessary light reaching the outer peripheral surface 30 can be decreased. In addition, the peripheral portions 24 may be constituted by a combination of arbitrary numbers of inclined surfaces and substantially flat surfaces that cause the thickness of the flange portions in the direction of the optical axis becomes thinner at positions closer to the peripheral edges of the flange surfaces 20 as illustrated in FIG. 18, in order to obtain similar advantageous effects.

Figure 20:
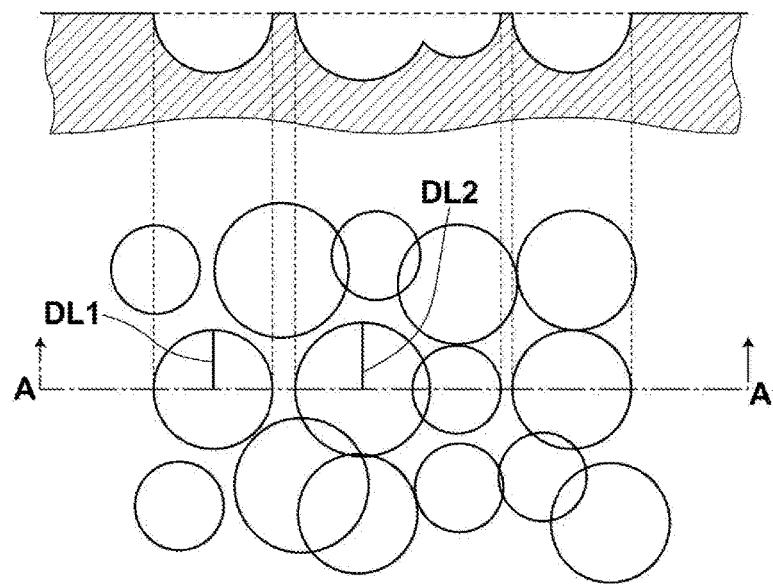
FIG. 20 is a diagram that illustrates a first example of the configuration of a portion of irregular protrusions and recesses.
Figure 21:
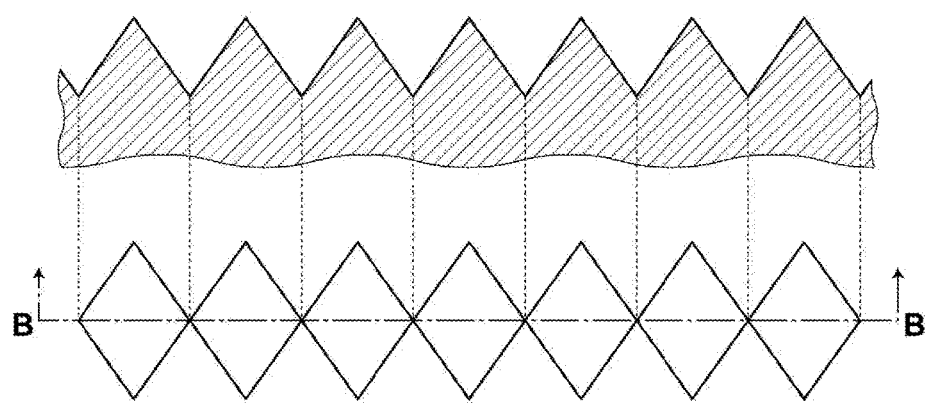
FIG. 21 is a diagram that illustrates a second example of the configuration of a portion of irregular protrusions and recesses.
Figure 22:
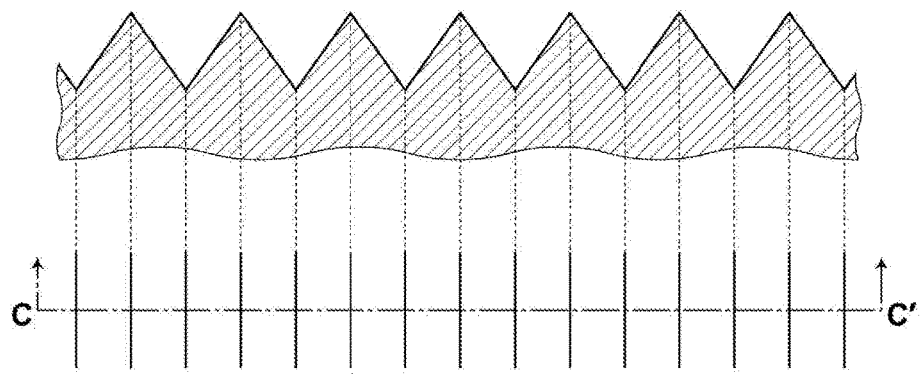
FIG. 22 is a diagram that illustrates a third example of the configuration of a portion of irregular protrusions and recesses.

It is preferable for the flange surfaces 20 to be provided with portions of irregular protrusions and recesses 23, in which fine recesses and/or fine protrusions are arranged in an irregular manner. The portions of irregular protrusions and recesses 23 may be of a desired shape that includes fine recesses and/or fine protrusions of desired shapes that form an irregular reflecting surface that functions to diffuse unnecessary light. Note that it is preferable for the heights in the direction of the optical axis of the fine protrusions and the depths in the direction of the optical axis of the fine recesses to be greater than 3 μm and less than 100 μm, for example. FIGS. 20 through 22 illustrate examples of recesses and protrusions of portions of irregular protrusions and recesses 23. The upper portion of FIG. 20 is a sectional diagram taken along line AA of the lower portion of FIG. 20, the upper portion of FIG. 21 is a sectional diagram taken along line BB of the lower portion of FIG. 21, and the upper portion of FIG. 22 is a sectional diagram taken along line CC of the lower portion of FIG. 22.

The example illustrated in FIG. 20 is that in which a plurality of fine recesses which are of approximately semicircular shapes having a radius of DL1 and a plurality of fine recesses which are of approximately semicircular shapes having a radius of DL2 smaller than DL1 are arranged in a random manner. It is preferable for the fine recesses to be configured such that the radius DL1 to satisfy conditional formula 3 µm<DL1<100 µm and for the radius DL2 to satisfy conditional formula 3 µm<DL2<20 µm within a range which is smaller than the radius DL1, for example. In the case that the portions of irregular protrusions and recesses 23 are those in which approximately semicircular shapes having different radii are randomly arranged in this manner, providing a plurality of surfaces having inclinations that differ in an irregular manner such that they are appropriately spatially separated is facilitated. As a result, unnecessary light that propagates in various directions can be favorably diffused or reflected, and the entry of unnecessary light into the imaging element can be suppressed.

Alternatively, the portions of irregular protrusions and recesses 23 may be constituted by fine protrusions and/or recesses of desired shapes such as polygonal pyramids and polygonal columns which are arranged randomly. The portions of irregular protrusions and recesses 23 may be formed by coating fine particles.

Alternatively, the portions of irregular protrusions and recesses 23 may be constituted by dividing a region which is to become a portion of irregular protrusions and recesses 23 into smaller regions, forming a plurality of fine protrusions (or fine recesses) such that they form a row in a predetermined direction in each divided small region, and changing the direction in which the row of fine protrusions (or fine recesses) extend among adjacent divided small regions, for example. Note that as an example, each divided small region may be a polygonal region having an area within a range from 900 µm$^2$ to 250000 µm$^2$, and a plurality of fine protrusions may be arranged with a spatial frequency within an approximate range from 3 µm/cycle to 100 µm/cycle within each divided small region. FIG. 21 illustrates an example in which approximate four sided pyramids are formed within each divided small region as an example of the fine protrusions. FIG. 22 illustrates an example in which a plurality of fine elongated protrusions that extend in a predetermined direction are formed within each divided small region as another example of the fine protrusions. FIG. 22 illustrates an example in which the fine protrusions example in which the fine protrusions are of an elongate shape with a triangular cross section. However, the fine protrusions may be of an elongate shape having other desired cross sectional shapes.

In addition, it is preferable for the flange surfaces 20 to be curved surfaces having at least one inflection point in the vicinities of the optical surfaces 10, and for the portions of irregular protrusions and recesses 23 to be provided toward the outer peripheral sides of the inflection points. In this case, the portions of the flange surfaces 20 toward the optical axis from the inflection points are of shapes which are continuous with the optical surfaces 10, at which the irregular fine protrusions and recesses are not present. By forming the regions between the optical surfaces 10 and the inflection points provided on the flange surfaces 20 to be those in which the irregular fine protrusions and recesses are not present in this manner, unnecessary light can be favorably reflected in directions that do not contribute to image formation, to be absorbed by the stop St2, the stop St3, and the lens barrel, thereby decreasing the amount of unnecessary light that enters the imaging element. In addition, the portions of irregular protrusions and recesses 23 provided toward the outer peripheries of the regions in which the portions of irregular protrusions and recesses 23 are not present diffuse unnecessary light, thereby reducing the amount of unnecessary light that reaches the imaging element. As a result, the luminance received per unit area (cd/m$^2$) received by the imaging element can be reduced.

In addition, it is preferable for a portion of irregular protrusions and recesses 23 to be provided on at least a portion of at least one arcuate groove portion 21. By adopting this configuration, providing a plurality of spatially remote locally inclined surfaces of which the inclinations differ in an irregular manner is facilitated, and unnecessary light that propagates from various directions can be effectively diffused or reflected. In the eighth embodiment, a portion of the arcuate groove portion 21ra (a region toward the outer periphery of an inflection point provided at a position of the flange surface closest to the optical surface) and the entirety of the arcuate groove portion 21rb are configured as a portion of irregular protrusions and recesses 23ra, within the arcuate groove portions 21ra and 21rb which are positioned adjacent to each other toward the inner peripheral side of the flange surface 20r. In addition, a portion of the arcuate groove portion 21fa (a region of the arcuate groove portion 21fa toward the outer periphery of an inflection point provided at a position of the flange surface closest to the optical surface) and the entireties of the arcuate groove portions 21fb and 21fc are configured as a portion of irregular protrusions and recesses 23fa, within the arcuate groove portions 21fa, 21fb, and 21fc which are positioned adjacent to each other toward the inner peripheral side of the flange surface 20f. In the case that a plurality of arcuate groove portions 21 (21ra and 21rb or 21fa, 21fb, and 21fc) constituted by smooth curved surfaces are provided, and portions of irregular protrusions and recesses 23 are provided at a portion or the entirety of the regions of the arcuate groove portions 21 toward the outer periphery of an inflection point provided at a position closest to the optical surfaces 10 in this manner, a plurality of inclined surfaces having different inclinations can be provided efficiently per unit area. As a result, the advantageous effect of reflecting or diffusing unnecessary light becomes more prominent.

In addition, in the eighth embodiment, fine protrusions and recesses are provided on the substantially flat surfaces and the inclined surfaces at the peripheral portions 24r and 24f, such that portions of the peripheral portions 24r and 24f constitute portions of irregular protrusions and recesses 23rb and 23fb. Thereby, a plurality of locally inclined surfaces having inclinations that differ in an irregular manner are provided in the vicinity of the outer peripheral surface 30. For this reason, the amount of unnecessary light can be reduced by the locally inclined surfaces diffusing or reflecting the unnecessary light, and unnecessary light entering the imaging element can be favorably suppressed.

Note that the ranges and positions at which the portions of irregular protrusions and recesses 23 are provided may be set as appropriate. For example, the portions of irregular protrusions and recesses 23 may be provided within a portion or the entirety of the arcuate groove portions 21.

Similarly, the portions of irregular protrusions and recesses 23 may be provided within a portion or the entirety of the peripheral portions 24.

Figure 23:
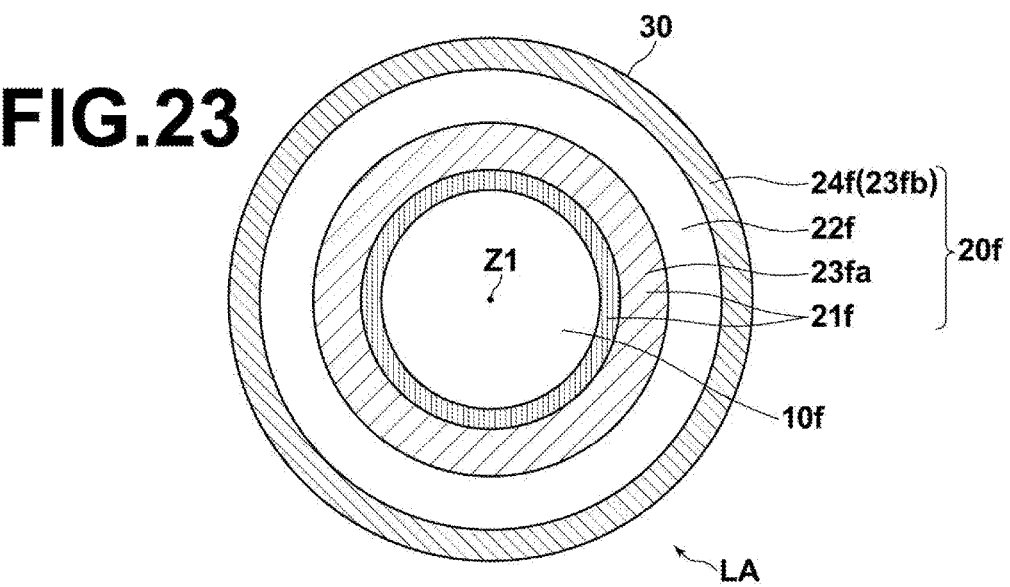
FIG. 23 is a diagram that illustrates an example of the arrangement of an arcuate groove portion and a portion of irregular protrusions and recesses.
Figure 24:
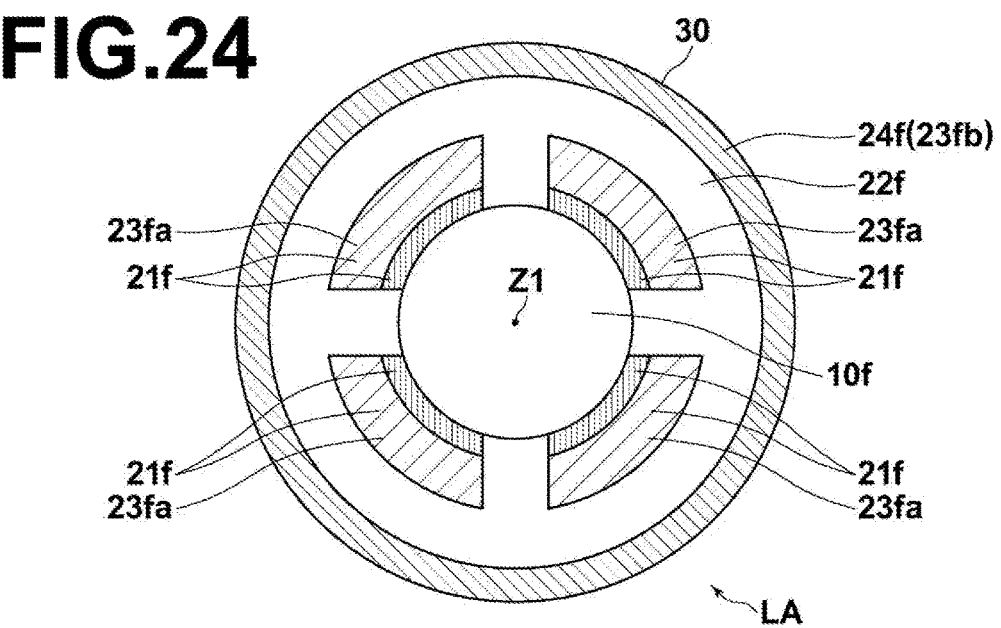
FIG. 24 is a diagram that illustrates a modification of the arrangement of an arcuate groove portion and a portion of irregular protrusions and recesses.

In addition, the arcuate groove portions 21 may be provided throughout the entire circumference of an annular region having the optical axis as its center, or provided at a portion of the annular region having the optical axis as its center. Similarly, the portions 23 of irregular protrusions and recesses may be provided throughout the entire circumference of the annular region having the optical axis as its center, or provided at a portion of the annular region having the optical axis as its center. FIG. 23 and FIG. 24 illustrate examples of flange surfaces 20f toward the object side provided with arcuate groove portions 21 and portions of irregular protrusions and recesses 23. FIG. 23 schematically illustrates the surface of the lens LA of the eighth embodiment toward the object side, although the dimensions of the flange surface, etc. differ from those of FIGS. 18 and 19.

FIGS. 23 and 24 illustrate the arcuate groove portions 21, the portions of irregular protrusions and recesses 23, flat surface portions 22, and peripheral portions 24 with different types of hatching. In FIGS. 23 and 24, fine protrusions and fine recesses are provided in an irregular manner across the entireties of the surfaces of the peripheral portions 24, which are configured as portions of irregular protrusions and recesses 23. In FIG. 23, the arcuate groove portions 21 are shown as a region that combines the arcuate groove portions 21fa, 21fb, and 21fc, which are provided throughout the circumference of an annular region having the optical axis as its center. In addition, fine protrusions and fine recesses are provided in an irregular manner at a portion of the arcuate groove portion 21fa (a region of the arcuate groove portion 21fa toward the outer periphery of an inflection point provided at a position of the flange surface closest to the optical surface) and the entireties of the arcuate groove portions 21fb and 21fc, which are configured as a portion of irregular protrusions and recesses 23fa. In addition, the flange surface 20f of FIG. 24 differs from that of FIG. 23 only in that the arcuate groove portions 21f, which have the same cross sectional shapes as the arcuate groove portions 21f of FIG. 23, are provided as arcs along a circle having the optical axis as its center. In addition, the portions of irregular protrusions and recesses 23fa of FIG. 24 differ from the portion of irregular protrusions and recesses 23fa of FIG. 23 in that they are provided as arcs along a circle having the optical axis as its center corresponding to the arrangement of the arcuate groove portions 21f.

FIG. 25 is a sectional diagram that illustrates a lens LA according to a ninth embodiment, and FIG. 26 is a sectional diagram that illustrates a lens LA according to a tenth embodiment. The ninth embodiment is a modification of the lens LA of the eighth embodiment, in which the arrangement of arcuate groove portions 21 and portions of irregular protrusions and recesses has been changed. The tenth embodiment is another modification of the lens LA of the eighth embodiment, in which the arrangement of arcuate groove portions 21 and portions of irregular protrusions and recesses has been changed further. With respect to the ninth and tenth embodiments, descriptions of configurations which are the same as those of the eighth embodiment will be omitted, and descriptions will be given mainly of portions that differ from the eighth embodiment. In FIGS. 25 and 26, Ef denotes the half value of the effective diameter of the surface of the lens LA toward the object side, Efs denotes the half value of the inner diameter of the stop St2, Er denotes the half value of the effective diameter of the surface of the lens LA toward the image side, and Ers denotes the half value of the inner diameter of the stop St3. In addition, the units of the numerical values that indicate dimensions in FIGS. 25 and 26 are mm As illustrated in FIG. 25, the flange surface 20r toward the image side of the lens LA of the ninth embodiment has a first arcuate groove portion 21ra positioned in the vicinity of the optical surface 10r, a flat surface portion 22r, and a peripheral portion 24r, provided in this order outward from the optical axis, A fourth arcuate groove portion 21rd is provided in the peripheral portion 24r. In addition, the flange surface 20f toward the object side has first and second arcuate groove portions 21fa and 21fb positioned in the vicinity of the optical surface 10f, a flat surface portion 22f, and a peripheral portion 24f, provided in this order outward from the optical axis. The peripheral portion 24f is constituted by inclined surfaces and substantially flat surfaces which are combined such that the depth in the direction of the optical axis becomes greater at positions closer to the peripheral edge of the flange surface 20f. According to the ninth embodiment, the fourth arcuate groove portion 21rd is provided in the peripheral portion 24r. Therefore, the amount of unnecessary light that reaches the outer peripheral surface 30 can be favorably reduced. As a result, the generation of ghosts and flares caused by unnecessary light reflected at the outer peripheral surface 30 can be suppressed. In addition, the number of arcuate groove portions positioned at the inner peripheral portions of the flange surface 20r toward the image side and the flange surface 20f toward the object side is less than that of the eighth embodiment. Therefore, the flange surfaces 20 become simpler shapes that can be produced more easily.

As illustrated in FIG. 26, the flange surface 20r toward the image side of the lens LA of the ninth embodiment has a first arcuate groove portion 21ra positioned in the vicinity of the optical surface 10r, a flat surface portion 22r, and a peripheral portion 24r, provided in this order outward from the optical axis, A fourth arcuate groove portion 21rd is provided in the peripheral portion 24r. In addition, the flange surface 20f toward the object side has first and second arcuate groove portions 21fa and 21fb positioned in the vicinity of the optical surface 10f, a flat surface portion 22f, and a peripheral portion 24f, provided in this order outward from the optical axis. A fourth arcuate groove portion 21fd is provided in the peripheral portion 24f. According to the tenth embodiment, the fourth arcuate groove portions 21rd and 21fd are provided in the peripheral portions 24r and 24f. Therefore, the amount of unnecessary light that reaches the outer peripheral surface 30 can be favorably reduced. In addition, the number of arcuate groove portions positioned at the inner peripheral portions of the flange surface 20r toward the image side and the flange surface 20f toward the object side is less than that of the eighth embodiment. Therefore, the flange surfaces 20 become simpler shapes that can be produced more easily.

According to the lenses LA of the eighth through tenth embodiments described above, the portions of irregular protrusions and recesses 23 provided in a portion or the entirety of the arcuate groove portions 21 favorably diffuse unnecessary light that reaches positions toward the outer periphery of the effective diameter, thereby causing the unnecessary light to be absorbed by the lens barrel or the stops. In addition, unnecessary light is diffused by the portions of irregular protrusions and recesses 23 provided in a portion or the entirety of the arcuate groove portions 21. Therefore, the amount of unnecessary light that reaches the imaging element can be reduced. For this reason, the luminance received per unit area ($cd/m^2$) received by the imaging element can be decreased, and deterioration of images caused by ghosts and flares can be suppressed. In addition, the shapes of the arcuate groove portions 21 are smooth curved surfaces. Therefore, the lenses LA can be produced precisely and easily by extrusion molding.

Any combination of the flange surfaces 20f and 20r of the eighth through tenth embodiments may be applied to any lens that constitutes the imaging lenses L of the first through seventh embodiments described above. The flange surfaces 20f and 20r may be applied to a portion of the lenses of the imaging lenses L or to all of the lenses of the imaging lenses L. In addition, the flange surface 20 may be applied to one of the surface toward the object side and the surface toward the image side of a single lens, or applied to both surfaces. Further, the flange surfaces 20f and 20r of the eighth through tenth embodiments are not only applicable to the imaging lens L of the present invention, but may also be favorably applied to imaging lenses constituted by an arbitrary number of lenses, each of which is configured to have an arbitrary lens shape. For example, the flange surfaces 20f and 20r may be applied to a portion of the lenses of an arbitrary imaging lens or to all of the lenses of the arbitrary imaging lens. In addition, the flange surface 20 may be applied to one of the surface toward the object side and the surface toward the image side of a single lens, or applied to both surfaces.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 4.47, Bf = 1.18, Fno. = 2.20, 2ω = 79.2

| Si | Ri | Di | Ndj | vdj |
|---|---|---|---|---|
| 1 (St) | ∞ | −0.14946 | | |
| *2 | 1.98305 | 0.62686 | 1.54488 | 54.867 |
| *3 | −267.18223 | 0.09656 | | |
| *4 | 5.74484 | 0.24014 | 1.63350 | 21.300 |
| *5 | 2.27965 | 0.53806 | | |
| *6 | 18.57381 | 0.41301 | 1.54488 | 54.867 |
| *7 | 1397.31718 | 0.60767 | | |
| *8 | −11.69411 | 0.53642 | 1.54488 | 54.867 |
| *9 | −1.50464 | 0.08604 | | |
| *10 | −3.65030 | 0.33151 | 1.63350 | 21.300 |
| *11 | −3.59589 | 0.25085 | | |
| *12 | −200.24991 | 0.51112 | 1.54488 | 54.867 |
| *13 | 1.41136 | 0.47831 | | |
| 14 | ∞ | 0.25111 | 1.51633 | 64.141 |
| 15 | ∞ | 0.53269 | | |
| 16 (IMG) | ∞ | | | |

*aspherical surface

TABLE 2

Example 1: Aspherical Surface Data

| Surface Number | KA | A3 | A4 | A5 | A6 |
|---|---|---|---|---|---|
| 2 | 1.0846733E+00 | 0.0000000E+00 | −4.6913962E−02 | 2.5979009E−01 | −5.4756682E−01 |
| 3 | −7.9482880E+00 | 0.0000000E+00 | −9.4611135E−02 | 5.9884716E−02 | 2.4193851E−01 |
| 4 | −4.8939083E+01 | 0.0000000E+00 | −1.1405206E−01 | −2.7369203E−01 | 2.1630836E+00 |
| 5 | −7.2882846E+00 | 0.0000000E+00 | −4.3083008E−02 | −9.8994343E−02 | 1.3566788E+00 |
| 6 | 1.3848985E+02 | 0.0000000E+00 | −2.0311859E−01 | 8.6807628E−01 | −4.5740397E+00 |
| 7 | −2.2354774E+01 | 0.0000000E+00 | 1.7434250E−01 | −3.1753155E+00 | 1.6932430E+01 |
| 8 | 2.2734298E+01 | 0.0000000E+00 | −4.0028330E−02 | 2.0418756E−01 | −2.6783483E−01 |
| 9 | 3.6201885E−01 | 0.0000000E+00 | −5.5551704E−02 | 5.7717633E−01 | −1.3865871E+00 |
| 10 | −2.8996393E+00 | 0.0000000E+00 | −4.3320537E−02 | 1.8232233E−01 | −1.8845637E−01 |
| 11 | 4.7654490E−02 | 0.0000000E+00 | 7.0578068E−02 | −4.6429782E−02 | 7.3772357E−02 |
| 12 | 6.6294572E+00 | 0.0000000E+00 | −1.5318378E−01 | 1.5432304E−01 | −2.7230333E−01 |
| 13 | −5.0373243E+00 | 0.0000000E+00 | −1.1935534E−01 | 6.0848537E−02 | 6.1092066E−02 |

| Surface Number | A7 | A8 | A9 | A10 | A11 |
|---|---|---|---|---|---|
| 2 | 2.0067122E−01 | −5.1405256E−01 | 7.1938454E+00 | −2.1307475E+01 | 2.9961816E+01 |
| 3 | −5.7752091E−01 | 6.5019827E−01 | −2.6854552E−01 | −3.4983558E−01 | 3.3759179E−01 |
| 4 | −6.8029295E+00 | 1.4865555E+01 | −2.0366022E+01 | 1.3424299E+01 | 2.1250305E+00 |
| 5 | −4.9540551E+00 | 1.1015070E+01 | −1.3816220E+01 | 6.5475288E+00 | 5.3791307E+00 |
| 6 | 1.4559070E+01 | −2.8440747E+01 | 3.1429195E+01 | −1.1794242E+01 | −1.4980754E+01 |
| 7 | −5.2028005E+01 | 1.0104174E+02 | −1.2969312E+02 | 1.1183243E+02 | −6.4539002E+01 |
| 8 | −2.8312732E−01 | 1.2862076E+00 | −1.7018355E+00 | 1.1079542E+00 | −3.0257629E−01 |
| 9 | 2.2788129E+00 | −2.6974187E+00 | 2.1143076E+00 | −9.2037544E−01 | 1.1426732E−01 |
| 10 | 2.5573946E−02 | −1.0625270E−01 | 3.4551387E−01 | −3.4362858E−01 | 1.6540987E−01 |
| 11 | −2.3631380E−01 | 2.4471533E−01 | −9.7224758E−02 | 8.9752168E−03 | 1.8024233E−03 |
| 12 | 4.4958647E−01 | −4.5754454E−01 | 2.9199170E−01 | −1.1573937E−01 | 2.6988370E−02 |
| 13 | −1.1401664E−01 | 8.3386371E−02 | −2.9249004E−02 | −2.5599058E−04 | 4.6258613E−03 |

| Surface Number | A12 | A13 | A14 |
|---|---|---|---|
| 2 | −2.2801059E+01 | 9.0548693E+00 | −1.4713198E+00 |
| 3 | 1.9370256E−01 | −3.4701188E−01 | 1.1948995E−01 |
| 4 | −1.0086868E+01 | 6.4602706E+00 | −1.4090297E+00 |

TABLE 2-continued

Example 1: Aspherical Surface Data

| | | | |
|---|---|---|---|
| 5 | −9.5251616E+00 | 5.2357857E+00 | −1.0525734E+00 |
| 6 | 2.2699710E+01 | −1.2149387E+01 | 2.4548840E+00 |
| 7 | 2.4268187E+01 | −5.5247353E+00 | 6.0022579E−01 |
| 8 | −3.9230455E−02 | 4.4116160E−02 | −7.7689519E−03 |
| 9 | 6.5921246E−02 | −2.6853119E−02 | 2.8623219E−03 |
| 10 | −4.1975382E−03 | 5.2606318E−03 | −2.4108511E−04 |
| 11 | 9.1796940E−04 | −5.4991058E−04 | 6.6323892E−05 |
| 12 | −3.2060622E−03 | 1.0283325E−04 | 7.8969642E−06 |
| 13 | −1.8745014E−03 | 3.3188800E−04 | −2.3045521E−05 |

TABLE 3

Example 2
f = 4.39, Bf = 1.13, Fno. = 2.19, 2ω = 76.6

| Si | Ri | Di | Ndj | vdj |
|---|---|---|---|---|
| 1 (St) | ∞ | −0.14946 | | |
| *2 | 1.89490 | 0.64597 | 1.54488 | 54.867 |
| *3 | −57.13044 | 0.08601 | | |
| *4 | 5.24273 | 0.21751 | 1.63350 | 21.300 |
| *5 | 2.10809 | 0.51182 | | |
| *6 | 9.37174 | 0.40499 | 1.54488 | 54.867 |
| *7 | 22.19569 | 0.58865 | | |
| *8 | −8.87784 | 0.48596 | 1.54488 | 54.867 |
| *9 | −1.51500 | 0.09558 | | |
| *10 | −3.90057 | 0.25393 | 1.63350 | 24.500 |
| *11 | −3.80807 | 0.30206 | | |
| *12 | −168.17540 | 0.39461 | 1.54488 | 54.867 |
| *13 | 1.40186 | 0.47831 | | |
| 14 | ∞ | 0.25111 | 1.51633 | 64.141 |
| 15 | ∞ | 0.48548 | | |
| 16 (IMG) | ∞ | | | |

*aspherical surface

TABLE 4

Example 2: Aspherical Surface Data

| Surface Number | KA | A3 | A4 | A5 | A6 |
|---|---|---|---|---|---|
| 2 | 1.0597458E+00 | 0.0000000E+00 | −2.0578464E−02 | −3.8729210E−01 | 4.0501638E+00 |
| 3 | −7.8179743E+02 | 0.0000000E+00 | −1.4812662E−01 | 1.9995420E−01 | −3.3847000E−01 |
| 4 | −4.9636467E+01 | 0.0000000E+00 | −1.9826990E−01 | −1.6407815E−01 | 1.9045117E+00 |
| 5 | −7.3497047E+00 | 0.0000000E+00 | −7.7190262E−02 | −9.2988261E−02 | 1.3994223E+00 |
| 6 | 3.6544385E+01 | 0.0000000E+00 | −2.0051112E−01 | 4.5311520E−01 | −1.4485601E+00 |
| 7 | −1.6861924E+01 | 0.0000000E+00 | −1.5099467E−01 | 8.0940408E−01 | −4.1041845E+00 |
| 8 | 1.4037521E+01 | 0.0000000E+00 | −9.7225235E−02 | 1.3699451E+00 | −6.3834316E+00 |
| 9 | 4.2960692E−01 | 0.0000000E+00 | −6.1902621E−02 | 8.5442947E−01 | −2.4348584E+00 |
| 10 | −2.9393358E+00 | 0.0000000E+00 | −4.4842935E−02 | 2.1722061E−01 | −3.3455355E−01 |
| 11 | 6.2290561E−02 | 0.0000000E+00 | 8.5181656E−02 | −5.4095567E−02 | 3.6979936E−02 |
| 12 | −4.9392110E+00 | 0.0000000E+00 | −1.5867926E−01 | 1.1929943E−01 | −1.4922541E−01 |
| 13 | −5.1388526E+00 | 0.0000000E+00 | −1.6307553E−01 | 1.6345332E−01 | −1.5279856E−01 |

| Surface Number | A7 | A8 | A9 | A10 | A11 |
|---|---|---|---|---|---|
| 2 | −1.7002169E+01 | 3.8313719E+01 | −4.8505030E+01 | 2.9856908E+01 | 7.5843899E−01 |
| 3 | 1.4339857E+00 | −2.1241648E+00 | −2.4381804E+00 | 1.3070545E+01 | −2.0926760E+01 |
| 4 | −4.1723969E+00 | 5.6552864E+00 | −3.8156472E+00 | −3.4205051E+00 | 1.0843833E+01 |
| 5 | −3.3171274E+00 | 1.7360708E+00 | 1.2934747E+01 | −4.1618081E+01 | 6.0805289E+01 |
| 6 | 2.9827537E+00 | −4.6153062E+00 | 5.3777990E+00 | −3.3542165E+00 | −1.3469471E+00 |
| 7 | 8.4413349E+00 | −1.0204407E+01 | −3.1703834E+01 | 7.2936934E+01 | −8.2974615E+01 |
| 8 | 1.5747714E+01 | −2.2267214E+01 | 1.6680111E+01 | −2.7451330E+00 | −6.0940160E+00 |
| 9 | 4.3779019E+00 | −5.0759714E+00 | 3.4146255E+00 | −7.8543074E−01 | −5.6774901E−01 |
| 10 | 4.4158702E−01 | −8.6130268E−01 | 1.2263245E+00 | −1.0155751E+00 | 4.9735456E−01 |
| 11 | −1.0233445E−01 | −1.4030541E−03 | 1.7298428E−01 | −1.7989880E−01 | 8.7164557E−02 |
| 12 | 2.1602752E−01 | −1.7966536E−01 | 7.6600436E−02 | −4.6657258E−03 | −1.0940218E−02 |
| 13 | 1.8096131E−01 | −1.5708172E−01 | 7.7755035E−02 | −1.6572247E−02 | −2.3693009E−03 |

| Surface Number | A12 | A13 | A14 |
|---|---|---|---|
| 2 | −1.3294032E+01 | 7.6312717E+00 | −1.4314010E+00 |
| 3 | 1.7546786E+01 | −7.7517603E+00 | 1.4260495E+00 |
| 4 | −1.0861891E+01 | 5.2366512E+00 | −1.0205064E+00 |
| 5 | −4.9009876E+01 | 2.1097811E+01 | −3.8006109E+00 |
| 6 | 4.3660898E+00 | −3.1556928E+00 | 8.1168295E−01 |
| 7 | 5.3893168E+01 | −1.9150652E+01 | 2.9065436E+00 |
| 8 | 5.4912048E+00 | −1.9691209E+00 | 2.7153074E−01 |
| 9 | 4.9735205E−01 | −1.4816678E−01 | 1.6179880E−02 |

TABLE 4-continued

Example 2: Aspherical Surface Data

| | | | |
|---|---|---|---|
| 10 | −1.4373562E−01 | 2.2782568E−02 | −1.5324661E−03 |
| 11 | −2.3232539E−02 | 3.3272981E−03 | −2.0236088E−04 |
| 12 | 5.0466080E−03 | −9.3459294E−04 | 6.5313765E−05 |
| 13 | 2.1850737E−03 | −4.6498347E−04 | 3.4704303E−05 |

TABLE 5

Example 3
$f = 4.37$, $Bf = 1.30$, $Fno. = 2.20$, $2\omega = 79.2$

| Si | Ri | Di | Ndj | vdj |
|---|---|---|---|---|
| 1 (St) | ∞ | −0.23999 | | |
| *2 | 2.00885 | 0.62531 | 1.54488 | 54.867 |
| *3 | −315.60879 | 0.08904 | | |
| *4 | 6.21212 | 0.22382 | 1.63350 | 23.618 |
| *5 | 2.34720 | 0.48293 | | |
| *6 | 9.35355 | 0.39743 | 1.54488 | 54.867 |
| *7 | 16.23376 | 0.67631 | | |
| *8 | −8.43067 | 0.51297 | 1.54488 | 54.867 |
| *9 | −1.50343 | 0.03594 | | |
| *10 | 114.83329 | 0.26525 | 1.63350 | 23.618 |
| *11 | −9.04263 | 0.24758 | | |
| *12 | −84.23687 | 0.43615 | 1.54488 | 54.867 |
| *13 | 1.26573 | 0.47831 | | |
| 14 | ∞ | 0.25111 | 1.51633 | 64.141 |
| 15 | ∞ | 0.65507 | | |
| 16 (IMG) | ∞ | | | |

*aspherical surface

TABLE 6

Example 3: Aspherical Surface Data

| Surface Number | KA | A3 | A4 | A5 | A6 |
|---|---|---|---|---|---|
| 2 | 1.0699072E+00 | 0.0000000E+00 | −3.4590625E−02 | 9.1375499E−02 | 2.6838589E−01 |
| 3 | −4.8204787E+03 | 0.0000000E+00 | −1.6151236E−01 | 1.0758079E−01 | 2.6916004E−01 |
| 4 | −4.7864164E+01 | 0.0000000E+00 | −2.2190155E−01 | −1.3196156E−01 | 1.2490670E+00 |
| 5 | −6.5782527E+00 | 0.0000000E+00 | −1.2135850E−01 | −7.2999249E−01 | 7.5876753E+00 |
| 6 | −1.6622301E+02 | 0.0000000E+00 | −1.7199729E−01 | 4.0059655E−01 | −1.8303926E+00 |
| 7 | −1.3249588E+02 | 0.0000000E+00 | −8.0313587E−02 | 5.8493764E−01 | −5.4738942E+00 |
| 8 | 8.4454592E+00 | 0.0000000E+00 | 1.1805508E−01 | −6.1914796E−01 | 2.5213007E+00 |
| 9 | 3.3798867E−01 | 0.0000000E+00 | −9.0964124E−02 | 5.6394854E−01 | −1.3461245E+00 |
| 10 | 4.5565965E+00 | 0.0000000E+00 | −1.1442067E−01 | −8.3852214E−02 | 6.0039597E−01 |
| 11 | −5.7023865E−02 | 0.0000000E+00 | 5.2708421E−02 | 3.8956769E−01 | −1.6387820E+00 |
| 12 | −4.7267351E+00 | 0.0000000E+00 | −1.1337500E−01 | 7.2923810E−02 | −7.1045420E−02 |
| 13 | −5.1125445E+00 | 0.0000000E+00 | −1.4020458E−01 | 7.9425279E−02 | 3.8343495E−02 |

| Surface Number | A7 | A8 | A9 | A10 | A11 |
|---|---|---|---|---|---|
| 2 | −1.9280342E+00 | 2.2158254E+00 | 7.3109110E+00 | −2.7533397E+01 | 4.0168569E+01 |
| 3 | −1.0200777E−02 | −1.4397436E+00 | 2.1685482E+00 | 2.8639009E−02 | −3.4393804E+00 |
| 4 | −1.8768153E+00 | 3.3707396E+00 | −6.8149701E+00 | 6.3739344E+00 | 1.1135719E+00 |
| 5 | −3.3494455E+01 | 9.2950743E+01 | −1.6930612E+02 | 2.0435574E+02 | −1.6166582E+02 |
| 6 | 5.0351772E+00 | −8.8978933E+00 | 8.6354780E+00 | −4.9180629E−02 | −1.1374258E+01 |
| 7 | 2.0025952E+01 | −3.9619477E+01 | 4.2635408E+01 | −1.6944790E+01 | −1.3871916E+01 |
| 8 | −5.6470116E+00 | 6.0428238E+00 | −9.9204358E−01 | −4.8753327E+00 | 5.8790326E+00 |
| 9 | 1.9773628E+00 | −1.6301241E+00 | 5.2842419E−01 | 3.6406495E−01 | −5.2741228E−01 |
| 10 | −1.0413567E+00 | 9.3027191E−01 | −3.9601209E−01 | −5.0118040E−03 | 8.8445181E−02 |
| 11 | 3.0563905E+00 | −3.7740639E+00 | 3.2503945E+00 | −1.9104475E+00 | 7.4329484E−01 |
| 12 | 8.8209657E−02 | 9.3449215E−02 | 7.0626460E−02 | −2.6740526E−02 | 1.5424858E−03 |
| 13 | −8.2201108E−02 | 6.0318911E−02 | −2.1134899E−02 | −1.6096723E−03 | 4.8527961E−03 |

| Surface Number | A12 | A13 | A14 |
|---|---|---|---|
| 2 | −3.0975027E+01 | 1.2441074E+01 | −2.0495356E+00 |
| 3 | 4.0405269E+00 | −2.0026542E+00 | 3.8660736E−01 |
| 4 | −7.0432174E+00 | 5.2445970E+00 | −1.2926749E+00 |
| 5 | 8.0374689E+01 | −2.2708008E+01 | 2.7763080E+00 |
| 6 | 1.4215261E+01 | −7.7882235E+00 | 1.6812154E+00 |
| 7 | 2.1176252E+01 | −1.0485877E+01 | 1.9287761E+00 |
| 8 | −3.1894032E+00 | 8.7493143E−01 | −9.8416556E−02 |
| 9 | 2.7280698E−01 | −6.7690462E−02 | 6.6304686E−03 |
| 10 | −4.2042783E−02 | 8.7587827E−03 | −7.1880578E−04 |
| 11 | −1.8275194E−01 | 2.5737005E−02 | −1.5847847E−03 |
| 12 | 2.0179148E−03 | −5.8265957E−04 | 4.9106310E−05 |
| 13 | −1.9946349E−03 | 3.6802792E−04 | −2.6885016E−05 |

TABLE 7

Example 4
f = 4.91, Bf = 1.09, Fno. = 2.19, 2ω = 74.2

| Si | Ri | Di | Ndj | vdj |
|---|---|---|---|---|
| 1 (St) | ∞ | −0.14946 | | |
| *2 | 1.84080 | 0.74890 | 1.54488 | 54.867 |
| *3 | −54.54953 | 0.10129 | | |
| *4 | 5.30867 | 0.22184 | 1.63350 | 23.618 |
| *5 | 2.07211 | 0.59445 | | |
| *6 | 6.94050 | 0.45247 | 1.54488 | 54.867 |
| *7 | 62.66474 | 0.50919 | | |
| *8 | −2.92722 | 0.28406 | 1.54488 | 54.867 |
| *9 | −3.35058 | 0.07695 | | |
| *10 | −165.67545 | 0.40506 | 1.63350 | 23.618 |
| *11 | −3.23498 | 0.31236 | | |
| *12 | −118.64521 | 0.56796 | 1.54488 | 54.867 |
| *13 | 1.65616 | 0.47831 | | |
| 14 | ∞ | 0.25111 | 1.51633 | 64.141 |
| 15 | ∞ | 0.44713 | | |
| 16 (IMG) | ∞ | | | |

*aspherical surface

TABLE 9

Example 5
f = 4.49, Bf = 1.16, Fno. = 2.20, 2ω = 79.0

| Si | Ri | Di | Ndj | vdj |
|---|---|---|---|---|
| 1 (St) | ∞ | −0.14946 | | |
| *2 | 2.01116 | 0.74142 | 1.54488 | 54.867 |
| *3 | −54.97436 | 0.06485 | | |
| *4 | 5.88024 | 0.23696 | 1.63350 | 23.618 |
| *5 | 2.36011 | 0.54619 | | |
| *6 | 14.72344 | 0.39026 | 1.54488 | 54.867 |
| *7 | 12.55186 | 0.51592 | | |
| *8 | −32.67144 | 0.53794 | 1.54488 | 54.867 |
| *9 | −1.71158 | 0.08865 | | |
| *10 | −4.21343 | 0.29980 | 1.63350 | 23.618 |
| *11 | −3.74185 | 0.30594 | | |
| *12 | 378.30872 | 0.52823 | 1.54488 | 54.867 |
| *13 | 1.47203 | 0.47831 | | |
| 14 | ∞ | 0.25111 | 1.51633 | 64.141 |
| 15 | ∞ | 0.51487 | | |
| 16 (IMG) | ∞ | | | |

*aspherical surface

TABLE 8

Example 4: Aspherical Surface Data

| Surface Number | KA | A3 | A4 | A5 | A6 |
|---|---|---|---|---|---|
| 2 | 1.0706328E+00 | 0.0000000E+00 | −9.9477431E−02 | 6.1876552E−01 | −1.6992018E+00 |
| 3 | −3.0948321E+03 | 0.0000000E+00 | −1.1429814E−01 | 5.1408333E−01 | −4.8444377E+00 |
| 4 | −4.6594410E+01 | 0.0000000E+00 | −1.9797265E−01 | 3.2236729E−01 | −3.2925955E+00 |
| 5 | −7.3261664E+00 | 0.0000000E+00 | −4.3375934E−02 | −1.6506388E−01 | 6.8287537E−01 |
| 6 | 1.8706947E+01 | 0.0000000E+00 | −1.1365904E−01 | 4.5090544E−02 | 8.6031257E−01 |
| 7 | 9.9678104E+00 | 0.0000000E+00 | −7.6123773E−02 | 8.4131971E−02 | −3.4172274E−01 |
| 8 | −1.6645889E+02 | 0.0000000E+00 | −9.5455106E−01 | 1.2485834E+00 | 3.9243408E+00 |
| 9 | 5.0155429E−01 | 0.0000000E+00 | −5.3368638E−01 | 6.0761272E−01 | −5.2888342E−01 |
| 10 | −2.8138469E+00 | 0.0000000E+00 | −4.3912870E−01 | 6.7258941E−01 | −1.3117908E+00 |
| 11 | 5.9974541E−02 | 0.0000000E+00 | 8.0764669E−02 | −1.1531864E−01 | 2.2727365E−01 |
| 12 | 5.4993985E+00 | 0.0000000E+00 | −1.4310577E−01 | 7.9484691E−02 | −7.5229978E−02 |
| 13 | −5.9768050E+00 | 0.0000000E+00 | −1.4939310E−01 | 1.0601661E−01 | −3.0516148E−03 |

| Surface Number | A7 | A8 | A9 | A10 | A11 |
|---|---|---|---|---|---|
| 2 | 1.7225353E+00 | 1.5376895E+00 | −5.9965506E+00 | 6.1601205E+00 | −2.0275173E+00 |
| 3 | 2.2965448E+01 | −5.8328695E+01 | 8.7592769E+01 | −7.8887784E+01 | 3.9309282E+01 |
| 4 | 1.7150529E+01 | −4.0476016E+01 | 4.9038421E+01 | −2.3655125E+01 | −1.2404877E+00 |
| 5 | −5.2396005E−01 | 1.3512965E+00 | −4.7029179E+00 | 5.0420182E+00 | 1.9793539E+00 |
| 6 | −5.0135708E+00 | 1.2287961E+01 | −1.5183273E+01 | 6.7724980E+00 | 5.8423985E+00 |
| 7 | 3.0100695E−01 | 3.5830958E−01 | −7.1541325E−01 | −1.1390427E−01 | 8.7213604E−01 |
| 8 | −1.6066542E+01 | 2.1426461E+01 | −5.1768080E+00 | −1.9765639E+01 | 2.7193337E+01 |
| 9 | 1.4271801E+00 | −1.9560945E+00 | 5.7243605E−01 | 1.4539025E+00 | −1.9610001E+00 |
| 10 | 2.9940539E+00 | −3.8873046E+00 | 2.7044941E+00 | −9.1645762E−01 | 3.3290417E−02 |
| 11 | −5.3212918E−01 | 6.4187213E−01 | −3.7395626E−01 | 8.8965682E−02 | 6.9465451E−03 |
| 12 | 1.4644980E−01 | −1.6465352E−01 | 1.0506315E−01 | −3.3571350E−02 | 1.7579609E−03 |
| 13 | −3.1045859E−02 | 1.4004950E−02 | 4.4882503E−04 | −2.2819168E−03 | 8.0408103E−04 |

| Surface Number | A12 | A13 | A14 |
|---|---|---|---|
| 2 | −9.5273122E−01 | 9.1872164E−01 | −2.0220737E−01 |
| 3 | −7.2647659E+00 | −1.6919192E+00 | 7.1138245E−01 |
| 4 | 2.3261148E+01 | −1.1994606E+01 | 2.2245623E+00 |
| 5 | −8.1051572E+00 | 6.0802884E+00 | −1.5392376E+00 |
| 6 | −9.7298772E+00 | 5.1591549E+00 | −1.0040108E+00 |
| 7 | −4.7823457E−01 | −4.6858103E−02 | 6.6602480E−02 |
| 8 | −1.6144137E+01 | 4.6877375E+00 | −5.3304615E−01 |
| 9 | 1.0962766E+00 | −2.9816315E−01 | 3.2185241E−02 |
| 10 | 8.1386449E−02 | −2.5285091E−02 | 2.4736830E−03 |
| 11 | −7.4771907E−03 | 1.0942251E−03 | −1.7027577E−05 |
| 12 | 2.0233015E−03 | −5.5208622E−04 | 4.4879942E−05 |
| 13 | −1.4562265E−04 | 2.2134338E−05 | −2.3804484E−06 |

TABLE 10

Example 5: Aspherical Surface Data

| Surface Number | KA | A3 | A4 | A5 | A6 |
|---|---|---|---|---|---|
| 2 | 1.0908462E+00 | 0.0000000E+00 | −4.6254438E−02 | 4.8764228E−02 | 1.5591494E+00 |
| 3 | −6.6863868E+02 | 0.0000000E+00 | −2.1251419E−01 | 3.0847261E−01 | −7.1796562E−01 |
| 4 | −4.9202998E+01 | 0.0000000E+00 | −2.5418805E−01 | −5.7715057E−02 | 3.2984404E+00 |
| 5 | −7.2915190E+00 | 0.0000000E+00 | −1.0619816E−01 | 1.8734706E−01 | −3.9327778E−01 |
| 6 | 8.7897153E+01 | 0.0000000E+00 | −2.1766317E−01 | 6.2390599E−01 | −3.6526333E+00 |
| 7 | −4.0168737E+01 | 0.0000000E+00 | −1.7970575E−01 | 9.0401705E−01 | −5.9991908E+00 |
| 8 | 2.8004180E+00 | 0.0000000E+00 | −5.9011492E−02 | 4.6259961E−02 | 1.1854944E+00 |
| 9 | 3.9680339E−01 | 0.0000000E+00 | −1.3881155E−01 | 5.8662313E−01 | −1.0378725E+00 |
| 10 | −2.7505523E+00 | 0.0000000E+00 | −3.2201659E−02 | −5.3100231E−02 | 6.0645213E−01 |
| 11 | −2.1887443E−02 | 0.0000000E+00 | 8.8010866E−02 | −4.5533047E−02 | 5.4860437E−02 |
| 12 | 6.7018612E+00 | 0.0000000E+00 | −1.5134090E−01 | 8.6350736E−02 | −7.0072865E−02 |
| 13 | −5.1274254E+00 | 0.0000000E+00 | −1.0433200E−01 | −5.7486494E−02 | 3.7688780E−01 |

| Surface Number | A7 | A8 | A9 | A10 | A11 |
|---|---|---|---|---|---|
| 2 | −1.0114651E+01 | 3.0108594E+01 | −5.2323108E+01 | 5.6443247E+01 | −3.7933580E+01 |
| 3 | 3.9122856E+00 | −1.0562355E+01 | 1.5182294E+01 | −1.1971557E+01 | 3.6189576E+00 |
| 4 | −1.9390454E+01 | 7.2845236E+01 | −1.7020934E+02 | 2.5007897E+02 | −2.3265732E+02 |
| 5 | 1.8351236E+00 | −4.2874838E+00 | .8844254E+00 | −1.3975299E+01 | 1.8709075E+01 |
| 6 | 1.2568594E+01 | −2.4298659E+01 | 2.0956051E+01 | 1.0303185E+01 | −4.5274468E+01 |
| 7 | 2.0981930E+01 | −4.3783284E+01 | 5.6524618E+01 | −4.3764585E+01 | 1.7000808E+01 |
| 8 | −5.7815405E+00 | 1.2986344E+01 | −1.7141894E+01 | 1.4246779E+01 | −7.5340465E+00 |
| 9 | 1.1964498E+00 | −6.8368642E−01 | −3.0673181E−01 | 9.9891342E−01 | −8.9355353E−01 |
| 10 | −1.2865546E+00 | 1.2587749E+00 | −6.3070536E−01 | 1.4037479E−01 | 4.6861499E−03 |
| 11 | −2.2663365E−01 | 2.4257815E−01 | −9.3633238E−02 | 5.3710195E−03 | 3.4232578E−03 |
| 12 | 1.2120172E−01 | −1.1499549E−01 | 5.3299855E−02 | −3.3720284E−03 | −8.3940776E−03 |
| 13 | −5.8324294E−01 | 5.2328817E−01 | −3.0249316E−01 | 1.1418862E−01 | −2.7491744E−02 |

| Surface Number | A12 | A13 | A14 |
|---|---|---|---|
| 2 | 1.5292899E+01 | −3.3840226E+00 | 3.2900451E−01 |
| 3 | 1.7511791E+00 | −1.7998178E+00 | 4.3947105E−01 |
| 4 | 1.3328420E+02 | −4.2895652E+01 | 5.9292755E+00 |
| 5 | −1.5438928E+01 | 6.8903445E+00 | −1.2713018E+00 |
| 6 | 4.7663627E+01 | −2.3457054E+01 | 4.6292176E+00 |
| 7 | 5.8829250E−02 | −2.5366407E+00 | 6.5837325E−01 |
| 8 | 2.4513083E+00 | −4.4497705E−01 | 3.4187473E−02 |
| 9 | 4.0419904E−01 | −9.2297183E−02 | 8.3713185E−03 |
| 10 | −8.5673358E−03 | 1.4278164E−03 | −6.2594850E−05 |
| 11 | 5.2162104E−04 | −4.9433788E−04 | 6.2579047E−05 |
| 12 | 3.9490191E−03 | −7.3845058E−04 | 5.1654709E−05 |
| 13 | 3.9449910E−03 | −2.8660689E−04 | 6.3583448E−06 |

TABLE 11

Example 6
f = 4.48, Bf = 1.16, Fno. = 2.19, 2ω = 75.6

| Si | Ri | Di | Ndj | vdj |
|---|---|---|---|---|
| 1 (St) | ∞ | −0.14946 | | |
| *2 | 2.02245 | 0.75010 | 1.54488 | 54.867 |
| *3 | −52.10802 | 0.06420 | | |
| *4 | 5.89422 | 0.23559 | 1.63350 | 24.600 |
| *5 | 2.36956 | 0.54524 | | |
| *6 | 14.09037 | 0.38424 | 1.54488 | 54.867 |
| *7 | 12.08155 | 0.52746 | | |
| *8 | −41.66599 | 0.55299 | 1.54488 | 54.867 |
| *9 | −1.65911 | 0.08626 | | |
| *10 | −4.11417 | 0.30396 | 1.63350 | 24.600 |
| *11 | −3.77800 | 0.30655 | | |
| *12 | −100.00057 | 0.50160 | 1.54488 | 54.867 |
| *13 | 1.46630 | 0.47831 | | |
| 14 | ∞ | 0.25111 | 1.51633 | 64.141 |
| 15 | ∞ | 0.51276 | | |
| 16 (IMG) | ∞ | | | |

*aspherical surface

TABLE 12

Example 6: Aspherical Surface Data

| Surface Number | KA | A3 | A4 | A5 | A6 |
|---|---|---|---|---|---|
| 2 | 1.0911264E+00 | 0.0000000E+00 | −6.6424540E−02 | 3.7252251E−01 | −7.0487176E−01 |
| 3 | −6.8130459E+02 | 0.0000000E+00 | −2.7405631E−01 | 1.2161412E+00 | −6.6565026E+00 |

TABLE 12-continued

Example 6: Aspherical Surface Data

| | | | | | |
|---|---|---|---|---|---|
| 4 | −4.9186932E+01 | 0.0000000E+00 | −3.5324233E−01 | 1.6922199E+00 | −1.0197537E+01 |
| 5 | −7.2909569E+00 | 0.0000000E+00 | −6.2486184E−02 | −5.7163635E−01 | 5.1296137E+00 |
| 6 | 7.6305076E+01 | 0.0000000E+00 | −3.6257060E−01 | 3.0322742E+00 | −2.0928836E+01 |
| 7 | −4.0894661E+01 | 0.0000000E+00 | −1.7685186E−01 | 9.1178715E−01 | −6.5463808E+00 |
| 8 | −1.2690410E+01 | 0.0000000E+00 | −1.5398670E−01 | 1.1417864E+00 | −3.9784964E+00 |
| 9 | 3.8862200E−01 | 0.0000000E+00 | −6.9345814E−02 | 1.1450636E−01 | 6.2087492E−01 |
| 10 | −2.8032853E+00 | 0.0000000E+00 | −9.0546699E−02 | 3.5746768E−01 | −5.6837764E−01 |
| 11 | −3.3828042E−02 | 0.0000000E+00 | 9.5995790E−02 | −1.1630574E−01 | 2.3899325E−01 |
| 12 | 6.7017818E+00 | 0.0000000E+00 | −1.2203361E−01 | −8.0343777E−02 | 3.2625256E−01 |
| 13 | −5.1367325E+00 | 0.0000000E+00 | −1.4940508E−01 | 1.7846543E−01 | −1.8195125E−01 |

| Surface Number | A7 | A8 | A9 | A10 | A11 |
|---|---|---|---|---|---|
| 2 | −1.1777617E+00 | 8.0280017E+00 | −1.6560746E+01 | 1.7921874E+01 | −1.0665016E+01 |
| 3 | 2.5856839E+01 | −6.1304302E+01 | 9.2089456E+01 | −8.9416340E+01 | 5.4670145E+01 |
| 4 | 3.9424741E+01 | −8.8268816E+01 | 1.2140583E+02 | −1.0483861E+02 | 5.5212365E+01 |
| 5 | −2.0901677E+01 | 5.4560250E+01 | −9.2348839E+01 | 9.9978999E+01 | −6.6769980E+01 |
| 6 | 8.2758339E+01 | −2.0423840E+02 | 3.2657430E+02 | −3.3933753E+02 | 2.2164448E+02 |
| 7 | 2.4950103E+01 | −5.7695772E+01 | 8.5398283E+01 | −8.1715261E+01 | 4.9029256E+01 |
| 8 | 7.8559543E+00 | −9.5760649E+00 | 7.4174364E+00 | −3.6176509E+00 | 1.0535738E+00 |
| 9 | −1.9880747E+00 | 2.7850516E+00 | −2.2723448E+00 | 1.2003565E+00 | −4.3122827E−01 |
| 10 | 5.5977945E−01 | −5.1545580E−01 | 4.5267784E−01 | −2.7761149E−01 | 1.0072908E−01 |
| 11 | −4.7842693E−01 | 4.4397137E−01 | −1.8371428E−01 | 1.9660316E−02 | 9.5273869E−03 |
| 12 | −3.8679489E−01 | 2.6640072E−01 | −1.1112213E−01 | 2.8253378E−02 | −4.5216179E−03 |
| 13 | 1.6864689E−01 | −1.0688787E−01 | 4.0365043E−02 | −7.9615660E−03 | 3.9093011E−04 |

| Surface Number | A12 | A13 |
|---|---|---|
| 2 | 3.1602968E+00 | −3.2797393E−01 |
| 3 | −1.9189536E+01 | 2.9557563E+00 |
| 4 | −1.6052686E+01 | 1.9467874E+00 |
| 5 | 2.5057606E+01 | −4.0386306E+00 |
| 6 | −8.2837655E+01 | 1.3537819E+01 |
| 7 | −1.6806144E+01 | 2.5157615E+00 |
| 8 | −1.6104073E−01 | 9.0201165E−03 |
| 9 | 9.8998870E−02 | −1.0748008E−02 |
| 10 | −1.9412368E−02 | 1.5356484E−03 |
| 11 | −3.2617620E−03 | 3.0193945E−04 |
| 12 | 4.8435118E−04 | −3.0250784E−05 |
| 13 | 1.2156146E−04 | −1.6097231E−05 |

TABLE 13

Example 7
f = 4.71, Bf = 1.07, Fno. = 2.14, 2ω = 73.0

| Si | Ri | Di | Ndj | vdj |
|---|---|---|---|---|
| 1 (St) | ∞ | −0.14946 | | |
| *2 | 1.86876 | 0.69750 | 1.54488 | 54.867 |
| *3 | −29.75421 | 0.12059 | | |
| *4 | 4.95527 | 0.23902 | 1.63350 | 23.618 |
| *5 | 1.90932 | 0.47134 | | |
| *6 | 6.55549 | 0.46301 | 1.54488 | 54.867 |
| *7 | 50.11580 | 0.37744 | | |
| *8 | −2.55308 | 0.33271 | 1.54488 | 54.867 |
| *9 | −3.04374 | 0.07350 | | |
| *10 | 6.27479 | 0.35346 | 1.63350 | 23.618 |
| *11 | −10.58178 | 0.41726 | | |
| *12 | −200.20139 | 0.75267 | 1.54488 | 54.867 |
| *13 | 2.30620 | 0.47831 | | |
| 14 | ∞ | 0.25111 | 1.51633 | 64.141 |
| 15 | ∞ | 0.42323 | | |
| 16 (IMG) | ∞ | | | |

*aspherical surface

TABLE 14

Example 7: Aspherical Surface Data

| Surface Number | KA | A3 | A4 | A5 | A6 |
|---|---|---|---|---|---|
| 2 | 1.0742521E+00 | 0.0000000E+00 | −1.7246946E−01 | 2.2277602E−01 | −1.4638218E+01 |
| 3 | −1.3040314E+03 | 0.0000000E+00 | 3.7051570E−01 | −6.0848766E+00 | 3.5922473E+01 |
| 4 | −4.6637299E+01 | 0.0000000E+00 | −9.9271703E−02 | −4.6997061E−01 | 3.5646946E+00 |
| 5 | −7.3344050E+00 | 0.0000000E+00 | −6.6397167E−03 | 3.4689644E−01 | −3.5724111E+00 |
| 6 | 1.6783397E+01 | 0.0000000E+00 | −1.3647277E−01 | 4.2283740E−01 | −1.3756917E+00 |
| 7 | −1.3120880E+01 | 0.0000000E+00 | 2.8306757E−02 | −8.7021728E−02 | −1.8866652E+00 |
| 8 | −1.3114961E+02 | 0.0000000E+00 | −1.3217713E+00 | 5.1465916E+00 | −1.3394938E+01 |

TABLE 14-continued

Example 7: Aspherical Surface Data

| | | | | | |
|---|---|---|---|---|---|
| 9 | 4.7536142E−01 | 0.0000000E+00 | −7.1112215E−01 | 3.1335116E−01 | 1.9512257E+00 |
| 10 | −2.7406277E+00 | 0.0000000E+00 | −6.9247919E−01 | −6.1339990E−01 | 4.0183502E+00 |
| 11 | 4.1642839E−02 | 0.0000000E+00 | 2.5839713E+00 | −2.1819928E+01 | 7.1819143E+01 |
| 12 | −6.7773221E+00 | 0.0000000E+00 | −1.6905258E−01 | 5.6551691E−02 | 3.1057098E−03 |
| 13 | −5.9487183E+00 | 0.0000000E+00 | −2.2750228E−01 | 7.1148786E−01 | −1.4728780E+00 |

| Surface Number | A7 | A8 | A9 | A10 | A11 |
|---|---|---|---|---|---|
| 2 | 5.6911365E+01 | −1.4031135E+02 | 2.2492362E+02 | −2.3371897E+02 | 1.5181382E+02 |
| 3 | −1.1647419E+02 | 2.3252485E+02 | −2.9723266E+02 | 2.4329899E+02 | −1.2286897E+02 |
| 4 | −1.1216267E+01 | 2.2783174E+01 | −3.0868632E+01 | 2.7355437E+01 | −1.5259581E+01 |
| 5 | 1.8108505E+01 | −4.9429129E+01 | 8.2007933E+01 | −8.5551325E+01 | 5.4878856E+01 |
| 6 | 2.9094979E+00 | −4.1071113E+00 | 3.3857536E+00 | −7.9963761E−01 | −1.0320800E+00 |
| 7 | 1.1513907E+01 | −3.2255502E+01 | 5.2858794E+01 | −5.3955848E+01 | 3.3977789E+01 |
| 8 | 2.8914332E+01 | −5.0344370E+01 | 6.5005622E+01 | −5.8175615E+01 | 3.3725186E+01 |
| 9 | −3.6552589E+00 | 3.8254037E+00 | −3.2977976E+00 | 2.3816135E+00 | −1.2216498E+00 |
| 10 | −6.3733534E+00 | 6.4752197E+00 | −4.9892101E+00 | 2.8131736E+00 | −1.0453356E+00 |
| 11 | −1.3168765E+02 | 1.5005306E+02 | −1.1048825E+02 | 5.2691396E+01 | −1.5732780E+01 |
| 12 | 7.6397736E−02 | −1.3665391E−01 | 1.1637701E−01 | −5.6830276E−02 | 1.5814128E−02 |
| 13 | 1.8846334E+00 | −1.5298868E+00 | 8.0594494E−01 | −2.7494898E−01 | 5.8585599E−02 |

| Surface Number | A12 | A13 |
|---|---|---|
| 2 | −5.6016531E+01 | 8.9590733E+00 |
| 3 | 3.4640130E· | −4.1278127E+00 |
| 4 | 4.8896112E+00 | −6.8659066E−01 |
| 5 | −1.9772320E+01 | 3.0620891E+00 |
| 6 | 8.6800909E−01 | −1.9818007E−01 |
| 7 | −1.2141935E+01 | 1.8900741E+00 |
| 8 | −1.1341921E+01 | 1.6752323E+00 |
| 9 | 3.6939932E−01 | −4.8478298E−02 |
| 10 | 2.2334501E−01 | −2.0632343E−02 |
| 11 | 2.6754360E +00 | −1.9788364E−01 |
| 12 | −2.3051020E−03 | 1.3517125E−04 |
| 13 | −7.0785310E−03 | 3.6965551E−04 |

TABLE 15

Values Related to Conditional Formulae

| Formula | Condition | Example 1 | Example 2 | Example 3 | Example 4 | Example 5 | Example 6 | Example 7 |
|---|---|---|---|---|---|---|---|---|
| 1 | f/f56 | −1.75 | −1.72 | −1.50 | −0.49 | −1.57 | −1.64 | −0.19 |
| 2 | DDL/f | 0.95 | 0.91 | 0.91 | 0.87 | 0.95 | 0.95 | 0.91 |
| 3 | f · P56 | 0.78 | 0.72 | 0.28 | 0.94 | 0.77 | 0.73 | 0.27 |
| 4 | f · P45 | 0.87 | 0.89 | 1.61 | 0.78 | 0.77 | 0.80 | 1.31 |
| 5 | f/f5 | 0.04 | 0.04 | 0.33 | 0.94 | 0.11 | 0.08 | 0.75 |
| 6 | ν2 | 21.3 | 21.3 | 23.6 | 23.6 | 23.6 | 24.6 | 23.6 |
| 7 | ν5 | 21.3 | 24.5 | 23.6 | 23.6 | 23.6 | 24.6 | 23.6 |
| 8 | f/f1 | 1.24 | 1.30 | 1.19 | 1.50 | 1.26 | 1.25 | 1.45 |
| 9 | f · tanω/L6r | 3.17 | 3.13 | 3.45 | 2.97 | 3.05 | 3.06 | 2.04 |

Note that the above paraxial radii of curvature, the distances among surfaces, the refractive indices, and the Abbe's numbers were obtained by measurements performed by specialists in the field of optical measurement, according to the methods described below.

The paraxial radii of curvature were obtained by measuring the lenses using an ultra high precision three dimensional measurement device UA3P (by Panasonic Factory Solutions K. K.) by the following procedures. A paraxial radius of curvature $R_m$ (m is a natural number) and a conical coefficient $K_m$ are preliminarily set and input into UA3P, and an nth order aspherical surface coefficient An of an aspherical shape formula is calculated from the input paraxial radius of curvature $R_m$ and conical coefficient $K_m$ and the measured data, using a fitting function of UA3P. $C=1/R_m$ and $KA=K_m-1$ are considered in the aforementioned aspherical surface shape formula (A). Depths Z of an aspherical surface in the direction of the optical axis corresponding to heights h from the optical axis are calculated from $R_m$, $K_m$, An, and the aspherical surface shape formula. The difference between the calculated depths Z and actually measured depth values Z' are obtained for each height h from the optical axis. Whether the difference is within a predetermined range is judged. In the case that the difference is within the predetermined range, $R_m$ is designated as the paraxial radius of curvature. On the other hand, in the case that the difference is outside the predetermined range, the value of at least one of $R_m$ and $K_m$ is changed, set as $R_{m+1}$ and $K_{m+1}$, and input to UA3P. The processes described above are performed, and judgment regarding whether the difference between the calculated depths Z and actually measured depth values Z' for each height h from the optical axis is within a predetermined range is judged. These procedures are repeated until the difference between the calculated depths Z and actually measured depth values Z' for each height h from the optical axis is within a predetermined range. Note that here, the predetermined range is set to be 200 nm or less. In addition, a range from 0 to ⅕ the maximum lens outer diameter is set as the range of h.

The distances among surfaces are obtained by measurements using OptiSurf (by Trioptics), which is an apparatus for measuring the central thicknesses and distances between surfaces of paired lenses.

The refractive indices are obtained by performing measurements in a state in which the temperature of a measurement target is 25° C., using KPR-2000 (by K. K. Shimadzu), which is a precision refractometer. The refractive index measured with respect to the d line (wavelength: 587.6 nm) is designated as Nd. Similarly, the refractive index measured with respect to the e line (wavelength: 546.1 nm) is designated as Ne, the refractive index measured with respect to the F line (wavelength: 486.1 nm) is designated as NF, the refractive index measured with respect to the C line (wavelength: 656.3 nm) is designated as NC, and the refractive index measured with respect to the g line (wavelength: 435.8 nm) is designated as Ng. The Abbe's number νd with respect to the d line is obtained by calculations, substituting the values of Nd, NF, and NC obtained by the above measurements into the formula below.

$$\nu d = (Nd-1)/(NF-NC)$$

What is claimed is:

1. An imaging lens consisting essentially of six lenses, including:
    a first lens of a biconvex shape;
    a second lens having a negative refractive power and is of a meniscus shape with a concave surface toward the image side;
    a third lens of a meniscus shape with a convex surface toward the object side;
    a fourth lens of a meniscus shape with a concave surface toward the object side;
    a fifth lens having a positive refractive power; and
    a sixth lens having a negative refractive power and a concave surface toward the image side, provided in this order from the object side.

2. An imaging lens consisting essentially of six lenses, including:
    a first lens having a positive refractive power and a convex surface toward the object side;
    a second lens having a negative refractive power and is of a meniscus shape with a concave surface toward the image side;
    a third lens of a meniscus shape with a convex surface toward the object side;
    a fourth lens;
    a fifth lens having a positive refractive power; and
    a sixth lens having a negative refractive power and a concave surface toward the image side, provided in this order from the object side;
    the imaging lens satisfying the conditional formulae below:

$$f/f56 < 0 \quad (1)$$

$$0.7 < DDL/f < 0.98 \quad (2)$$

wherein f56 is the combined focal length of the fifth lens and the sixth lens, f is the focal length of the entire system, and DDL is the distance from the surface of the first lens toward the object side and the surface of the sixth lens toward the image side along the optical axis.

3. An imaging lens consisting essentially of six lenses, including:
    a first lens having a positive refractive power and a convex surface toward the object side;
    a second lens having a negative refractive power and a concave surface toward the image side;
    a third lens of a meniscus shape with a convex surface toward the object side;
    a fourth lens having a positive refractive power;
    a fifth lens having a positive refractive power; and
    a sixth lens having a negative refractive power and a concave surface toward the image side, provided in this order from the object side;
    the imaging lens satisfying the conditional formulae below:

$$f/f56 < 0 \quad (1)$$

$$0.7 < DDL/f < 0.98 \quad (2)$$

wherein f56 is the combined focal length of the fifth lens and the sixth lens, f is the focal length of the entire system, and DDL is the distance from the surface of the first lens toward the object side and the surface of the sixth lens toward the image side along the optical axis.

4. An imaging lens as defined in claim 1 that further satisfies the conditional formula below:

$$0 < f \cdot P56 < 2 \quad (3)$$

wherein f is the focal length of the entire system, and P56 is the refractive power of an air lens formed between the surface of the fifth lens toward the image side and the surface of the sixth lens toward the object side, the refractive power of the air lens being obtained by Formula (P1) below:

$$P56 = \frac{1-Nd5}{L5r} + \frac{Nd6-1}{L6f} - \frac{(1-Nd5) \times (Nd6-1) \times D11}{L5r \times L6f} \quad (P1)$$

wherein Nd5 is the refractive index of the fifth lens with respect to the d line, Nd6 is the refractive index of the sixth lens with respect to the d line, L5r is the paraxial radius of curvature of the surface of the fifth lens toward the image side, L6f is the paraxial radius of curvature of the surface of the sixth lens toward the object side, and D11 is an air space distance between the fifth lens and the sixth lens along the optical axis.

5. An imaging lens as defined in claim 1 that further satisfies the conditional formula below:

$$0 < f \cdot P45 < 1.7 \quad (4)$$

wherein f is the focal length of the entire system, and P45 is the refractive power of an air lens formed between the surface of the fourth lens toward the image side and the surface of the fifth lens toward the object side, the refractive power of the air lens being obtained by Formula (P2) below:

$$P45 = \frac{1-Nd4}{L4r} + \frac{Nd5-1}{L5f} - \frac{(1-Nd4) \times (Nd5-1) \times D9}{L4r \times L5f} \quad (P2)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

6. An imaging lens as defined in claim 1 that further satisfies the conditional formula below:

$$0 < f/f5 < 1 \quad (5)$$

wherein f is the focal length of the entire system, and f5 is the focal length of the fifth lens.

7. An imaging lens as defined in claim 1 that further satisfies the conditional formula below:

$$20 < v2 < 28 \quad (6)$$

wherein v2 is the Abbe's number of the second lens with respect to the d line.

8. An imaging lens as defined in claim 1 that further satisfies the conditional formula below:

$$20 < v5 < 28 \quad (7)$$

wherein v5 is the Abbe's number of the fifth lens with respect to the d line.

9. An imaging lens as defined in claim 1 that further satisfies the conditional formula below:

$$1 < f/f1 < 2 \quad (8)$$

wherein f is the focal length of the entire system, and f1 is the focal length of the first lens.

10. An imaging lens as defined in claim 1, further comprising:
an aperture stop positioned at the object side of the surface of the first lens toward the object side.

11. An imaging lens as defined in claim 1 further satisfies the conditional formula below:

$$0.5 < f \cdot \tan \omega / L6r < 20 \quad (9)$$

wherein f is the focal length of the entire system, ω is half the maximum angle of view when focused on an object at infinity, and L6r is the paraxial radius of curvature of the surface of the sixth lens toward the image side.

12. An imaging lens as defined in claim 2 that further satisfies the conditional formula below:

$$-4 < f/f56 < -0.1 \quad (1-1)$$

wherein f56 is the combined focal length of the fifth lens and the sixth lens, and f is the focal length of the entire system.

13. An imaging lens as defined in claim 2 that further satisfies the conditional formula below:

$$0.8 < DDL/f < 0.96 \quad (2-1)$$

wherein f is the focal length of the entire system, and DDL is the distance from the surface of the first lens toward the object side to the surface of the sixth lens toward the image side along the optical axis.

14. An imaging lens as defined in claim 4 that further satisfies the conditional formula below:

$$0.1 < f \cdot P56 < 1.27 \quad (3-1)$$

wherein f is the focal length of the entire system, and P56 is the refractive power of an air lens formed between the surface of the fifth lens toward the image side and the surface of the sixth lens toward the object side, the refractive power of the air lens being obtained by Formula (P1) below:

$$P56 = \frac{1 - Nd5}{L5r} + \frac{Nd6 - 1}{L6f} - \frac{(1 - Nd5) \times (Nd6 - 1) \times D11}{L5r \times L6f} \quad (P1)$$

wherein Nd5 is the refractive index of the fifth lens with respect to the d line, Nd6 is the refractive index of the sixth lens with respect to the d line, L5r is the paraxial radius of curvature of the surface of the fifth lens toward the image side, L6f is the paraxial radius of curvature of the surface of the sixth lens toward the object side, and D11 is an air space distance between the fifth lens and the sixth lens along the optical axis.

15. An imaging lens as defined in claim 5 that further satisfies the conditional formula below:

$$0.32 < f \cdot P45 < 1.65 \quad (4-1)$$

wherein f is the focal length of the entire system, and P45 is the refractive power of an air lens formed between the surface of the fourth lens toward the image side and the surface of the fifth lens toward the object side, the refractive power of the air lens being obtained by Formula (P2) below:

$$P45 = \frac{1 - Nd4}{L4r} + \frac{Nd5 - 1}{L5f} - \frac{(1 - Nd4) \times (Nd5 - 1) \times D9}{L4r \times L5f} \quad (P2)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

16. An imaging lens as defined in claim 6 that further satisfies the conditional formula below:

$$0.01 < f/f5 < 0.98 \quad (5-1)$$

wherein f is the focal length of the entire system, and f5 is the focal length of the fifth lens.

17. An imaging lens as defined in claim 7 that further satisfies the conditional formula below:

$$21 < v2 < 25 \quad (6-1)$$

wherein v2 is the Abbe's number of the second lens with respect to the d line.

18. An imaging lens as defined in claim 8 that further satisfies the conditional formula below:

$$21 < v5 < 25 \quad (7-1)$$

wherein v5 is the Abbe's number of the fifth lens with respect to the d line.

19. An imaging lens as defined in claim 1, wherein:
the surface of the third lens toward the image side is of an aspherical shape having at least one inflection point at a position in an inwardly radial direction from the intersection of a principal light ray at a maximum angle of view and the surface of the third lens toward the image side to the optical axis.

20. An imaging apparatus equipped with an imaging lens as defined in claim 1.

* * * * *